US008839926B2

(12) United States Patent
Hou et al.

(10) Patent No.: US 8,839,926 B2
(45) Date of Patent: Sep. 23, 2014

(54) JAM TOLERANT ACTUATOR DECOUPLER

(75) Inventors: Suyu Hou, Niskayuna, NY (US);
George Ghanime, Ballston Spa, NY (US); David J. Wagner, Niskayuna, NY (US); Michael Colan Moscinski, Niskayuna, NY (US); Robert Zirin, Niskayuna, NY (US); Mahadevan Balasubramaniam, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 266 days.

(21) Appl. No.: 13/435,560

(22) Filed: Mar. 30, 2012

(65) Prior Publication Data

US 2013/0256086 A1 Oct. 3, 2013

(51) Int. Cl.
*F16D 11/16* (2006.01)
*F16D 43/02* (2006.01)
*F16D 9/00* (2006.01)

(52) U.S. Cl.
USPC .............. 192/39; 192/56.5; 192/71; 192/101; 192/150

(58) Field of Classification Search
CPC ........................................................ F16D 9/00
USPC ......................................................... 192/39
See application file for complete search history.

(56) References Cited

U.S. PATENT DOCUMENTS

| | | | | |
|---|---|---|---|---|
| 2,846,039 | A | * | 8/1958 | Requa et al. ............... 192/71 |
| 2,907,432 | A | * | 10/1959 | Strickland et al. .......... 192/71 |
| 4,392,759 | A | * | 7/1983 | Cook ......................... 403/11 |
| 4,466,520 | A | * | 8/1984 | Herman ...................... 192/71 |
| 4,575,027 | A | | 3/1986 | Cronin |
| 4,858,691 | A | | 8/1989 | Ilfrey et al. |
| 5,518,466 | A | | 5/1996 | Tiedeman |
| 5,628,234 | A | | 5/1997 | Crook et al. |
| 7,134,672 | B2 | | 11/2006 | Beishline et al. |
| 7,207,322 | B2 | | 4/2007 | Meiwes et al. |

FOREIGN PATENT DOCUMENTS

| | | |
|---|---|---|
| DE | 308245 C | 10/1918 |
| DE | 309874 C | 12/1918 |

OTHER PUBLICATIONS

Search Report and Written Opinion from corresponding EP Application No. 13160905.9-1756 dated Jul. 5, 2013.

* cited by examiner

*Primary Examiner* — Rodney H Bonck
(74) *Attorney, Agent, or Firm* — Scott J. Asmus

(57) ABSTRACT

An actuator decoupler for selectively coupling and decoupling a driving part and a driven part of an actuation system is disclosed. The driving part can be coupled to the actuator decoupler, and the actuator decoupler can be coupled to the driven part via at least one coupling pin. In a selectively coupled state, the driven part can be at least one of rotationally and longitudinally fixed to the actuator decoupler and, thereby, the driving part. The actuator decoupler can be decoupled from the driven part through the use of a preloaded energy mechanism configured to disengage the at least one coupling pin from the driven part. Thereby, the actuator may be responsive to a jam in the actuation system to selectively decouple the driven part from the actuator decoupler and the driving part so that the driven part has freedom to translate at least one of rotationally and longitudinally.

24 Claims, 15 Drawing Sheets

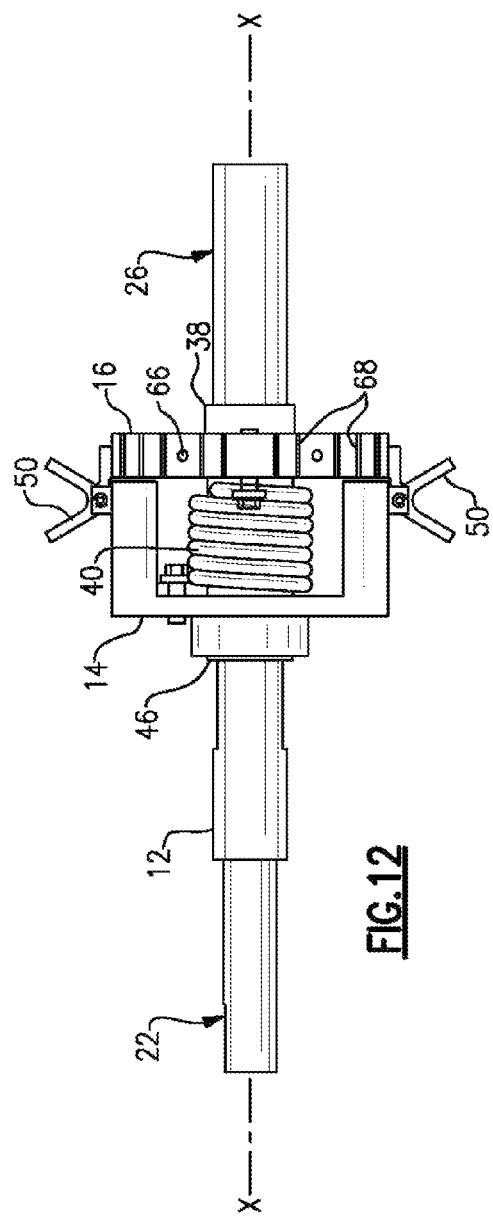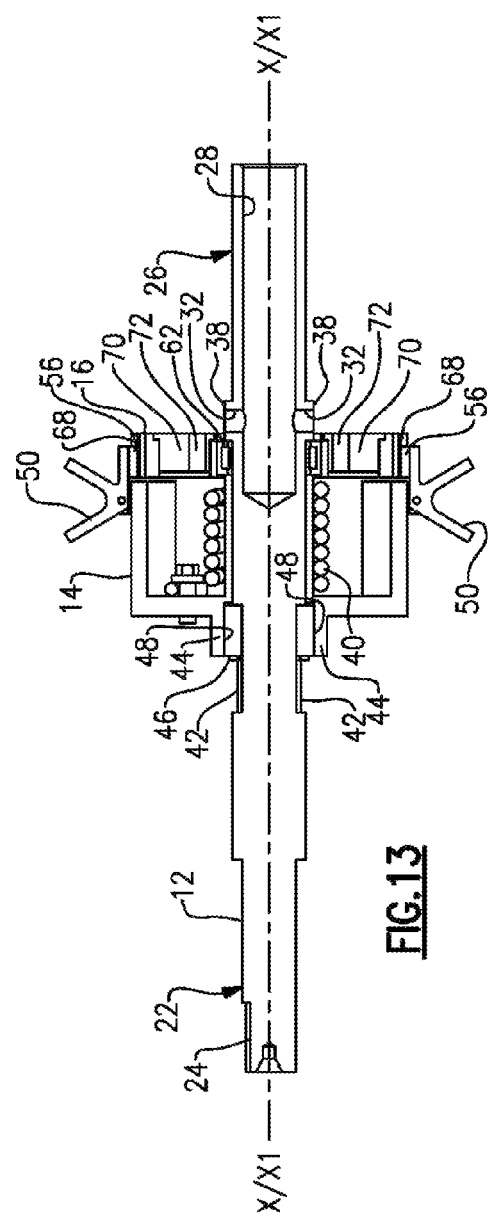

JAM TOLERANT ACTUATOR DECOUPLER

BACKGROUND

Actuators are widely used throughout many industries to control the movement of various components. Some actuators are configured to transfer rotational energy between components to, ultimately, effectuate movement of a surface or component. Similarly, some actuators are configured to transfer linear energy between components to, ultimately, effectuate movement of a surface or component. Still further, some actuators are configured to transfer both rotational and linear energy between components to, ultimately, effectuate movement of a surface or component.

Some actuator applications require reliable, fail-free or fails-safe mechanical or electro-mechanical actuators. More specifically, many applications require actuators which include mechanisms that limit an input force and/or release the actuated load during fail situations, such as when one component of the actuation system in which the actuator is installed fails or is otherwise compromised and thereby limits or prevents movement of the actuated surface or component (i.e., the load recipient). Such mechanisms limit or prevent damage to components during overload situations and free the actuated load from a jam in the actuation system. For example, some actuation systems employ torque limiters or overload clutches which automatically limit torque throughput by slipping or shearing of components at a certain predefined maximum torque. Similarly, some actuators employ mechanisms which automatically limit axial force throughput by slipping or shearing of components at a certain predefined maximum axial force. However, these mechanisms are often unreliable, inaccurate, cannot be customized (as the "release" parameter often cannot be changed after installation), are difficult to reset after "release" and are difficult to scale. These mechanisms are also typically designed to only limit force in a particular direction (e.g., only limit torque or only limit axial force).

These types of mechanism are therefore not well suited for applications in which prevention of overload situations and release of the actuated surface or components during a jam is vital. For example, in the aviation industry, reliability of actuators relied upon for control of flight control surfaces is paramount. Due to the operating conditions of flight control surfaces, movement of flight control surfaces in aircraft is effectuated by redundant actuators. When one of these actuators fails, such as when a jam occurs, it is vitally important that the failed actuator does not prevent movement of the flight control surface to which the actuator is coupled. Typically, movement of a flight control surface directly results in movement of the components of the actuators configured to effectuate movement of the surface. Thus, if an actuator has failed in a manner such that the components of the actuator are locked with one another or are otherwise incapable of movement, the failed actuator effectively prevents movement of the control surface by the other properly-functioning redundant actuators or other actuator control mechanisms.

As a result, a need exists for reliable, accurate and scalable actuators that are capable of selectively coupling and decoupling components of the actuator in response to a jam or other failure of the actuator to disengage components of the actuator to free the actuated component or surface from the failed actuator. In such situations, a particular need exits for actuators which are capable of selectively fixing or locking components of the actuator (such as rotationally or angularly, longitudinally or axially, or both rotationally and longitudinally) when the actuator is properly functioning, and also reliably responsive to a failure of the actuator (e.g., a jam in the actuator) to disengage components of the actuator with respect to one another (such as rotationally, longitudinally, or both rotationally and longitudinally) and, thereby, free the actuated component or surface (i.e., the load recipient).

SUMMARY

In accordance with one aspect of the present disclosure, an actuator decoupler for selectively coupling and decoupling a driven part with a driving part of an actuation system is disclosed. In some such embodiments, the actuator decoupler includes a sleeve member, a housing member, at least one coupling pin, at least one preloaded energy mechanism, and at least one engageable locking member.

In some such embodiments, the sleeve member defies a longitudinal axis and includes a first portion configured to couple to the driven part, and a second portion configured to couple to the driving part to receive at least one of a torque about the longitudinal axis and a force along the longitudinal axis. In some such embodiments, the housing member is rotationally and longitudinally fixed to the sleeve member.

In some such embodiments, the at least one coupling pin is selectively engaged with the second portion of the sleeve member and the driven part when the driven part is coupled to the sleeve member such that the sleeve member and the driven part are at least one of rotationally and longitudinally fixed to one another by the at least one coupling pin. In some such embodiments, the at least one preloaded energy mechanism is coupled to the housing member and the at least one coupling pin.

In some such embodiments, the at least one engageable locking member is movably coupled to the at least one preloaded energy mechanism. In some such embodiments, the at least one engageable locking member is configured to selectively retain preloaded energy of the at least one preloaded energy mechanism and maintain the engagement of the at least one coupling pin with the sleeve member and the driven part in a locking position. In some such embodiments, in an unlocking position the at least one engageable locking member is configured to selectively release the preloaded energy of the at least one preloaded energy mechanism to disengage the at least one coupling pin from at least the driven part such that the driven part is free to translate at least one of rotationally and longitudinally with respect to the sleeve member and the driving part.

In some embodiments, the at least one preloaded energy mechanism is a preloaded resilient member coupled to a cam disc that is rotatably coupled about the sleeve member. In some such embodiments, the resilient member is a torsion spring, and wherein the preloaded energy of the torsion spring is a torque applied to the cam disc that biases the cam disc in a first rotational direction.

In some such embodiments, when each coupling pin is selectively engaged with the sleeve member and the driven part, each coupling pin is received with an aperture of the sleeve member and an aperture of the driven part. In some such embodiments, the cam disc includes two longitudinally spaced cam disc members. In some such embodiments, the cam disc members include at least one pair of substantially aligned cam slots corresponding to each coupling pin. In some such embodiments, each pair of cam slots is movably coupled about a cam pin that is engaged to a corresponding coupling pin that is positioned between the cam disc members.

In some such embodiments, each cam slot defines a profile that extends angularly and laterally about the longitudinal axis such that a first slot portion of each cam slot is laterally proximate the longitudinal axis and a second slot portion angularly spaced from the first portion and laterally distal the longitudinal axis. In some such embodiments, each cam pin is positioned within the first slot portion of a corresponding pair of cam slots when the at least one engageable locking member retains the preloaded torque of the torsion spring and maintains the engagement of the at least one coupling pin with the sleeve member and the driven part. In some such embodiments, each cam pin is positioned within the second slot portion of a corresponding pair of cam slots when the preloaded torque of the torsion spring is released to disengage the at least one coupling pin from at least the driven part.

In some such embodiments, each cam slot is configured such that when the at least one engageable locking member releases the preload torque of the torsion spring the cam disc rotates in the first direction and each cam pin is translated from the first slot portion to the second slot portion in a corresponding pair of cam slots. In some such embodiments, the lateral distance between the first slot portion and the second slot portion of each cam slot is greater than the lateral distance of each pin in the aperture of the driven part when each cam pin is selectively engaged with the driven part. In some such embodiments, each cam slot is configured such that the first slot portion extends for predetermined degree of angulation about the longitudinal axis, and wherein the lateral location of the first slot portion of the each cam slot is constant. In some embodiments, the at least one engageable locking member is configured to interact with a secondary actuator that is responsive to a jam in the actuation system. In some such embodiments, the at least one engageable locking member includes a first arm configured to selectively engage the cam disc in a locking position to selectively rotationally fix the cam disc to selectively retain the preloaded torque of the torsion spring and to maintain the engagement of the at least one coupling pin with the sleeve member and the driven part.

In some such embodiments, the at least one engageable locking member includes second and third longitudinally spaced arms configured to receive a portion of the secondary actuator therebetween, and translation of the portion of the secondary actuator in a first longitudinal direction results in the portion interacting with the second arm and thereby repositioning the at least one engageable locking member from the locking position to the unlocking position to selectively disengage the first arm from the cam disc to release the preloaded torque of the torsion spring to disengage the at least one coupling pin from at least the driven.

In some such embodiments, when the portion of the secondary actuator is positioned between the second and third arms of the at least one engageable locking member and the at least one engageable locking member is in the locking position, the third arm is positioned on an opposing longitudinal side of the portion of the secondary actuator as compared to the second arm to prevent the at least one engageable locking member from repositioning from the locking position to the unlocking position without translation of the at least one engageable locking member.

In some embodiments, the at least one preloaded energy mechanism includes at least one preloaded cantilever member extending from the housing member and defining a free end. In some such embodiments, the at least one coupling pin is provided on a portion of the at least one cantilever member adjacent the free end, and the at least one cantilever member is deformed to preload the at least one cantilever member and position the at least one coupling pin within an aperture of the second portion of the sleeve member and an aperture of the driven part when each coupling pin is selectively engaged with the sleeve member and the driven part.

In some embodiments, the second portion of the sleeve member is configured to couple to the driving part to receive at least a torque from the driving part, and thereby rotate about the longitudinal axis. In some such embodiments, the sleeve member and the driven part are at least rotationally fixed to one another by the at least one coupling pin when the driven part is coupled to the sleeve member. In some such embodiments, the driven part is free to translate at least rotationally with respect to the sleeve member and the driving part when the at least one coupling pin is disengaged from the driven part of the sleeve member. In some such embodiments, the sleeve member and the driven part are also longitudinally fixed to one another by the at least one coupling pin when the driven part is coupled to the sleeve member. In some such embodiments, the driven part is also free to translate longitudinally with respect to the sleeve member and the driving part when the at least one coupling pin is disengaged from the driven part of the sleeve member.

In some embodiments, the second portion of the sleeve member is configured to couple to the driving part to receive at least a force along the longitudinal axis from the driving part, and thereby translate along the longitudinal axis. In some such embodiments, the sleeve member and the driven part are at least longitudinally fixed to one another by the at least one coupling pin when the driven part is coupled to the sleeve member. In some such embodiments, the driven part is free to translate at least longitudinally with respect to the sleeve member and the driving part when the at least one coupling pin is disengaged from the driven part of the sleeve member.

In accordance with another aspect of the present disclosure, an actuator decoupler for selectively coupling and decoupling a driven part including an aperture with a driving part of an actuation system such that when selectively coupled the driven part is at least rotationally fixed to the driving part and when selectively decoupled the driven part is at least one of rotationally and longitudinally free to with respect to the driving part is disclosed. In some such embodiments, the actuator decoupler includes a sleeve member, a cam disc, at least one coupling pin, a housing member, and no more than one energy mechanism.

In some such embodiments, the sleeve member defines a longitudinal axis and an aperture, and is configured to receive at least a torque via the driving part and, upon receipt thereof, to rotate about the longitudinal axis. In some such embodiments, the cam disc is rotationally coupled about the sleeve member and includes two longitudinally spaced cam members. In some such embodiments, the cam members including at least one pair of substantially aligned cam slots defining a cam profile.

In some such embodiments, the at least one coupling pin is carried within the aperture of the sleeve member, and a pair of cam slots of the cam disc and positioned at least partially between the cam members of the cam disc. In some such embodiments, the housing member is rotationally and longitudinally fixed to the sleeve member and includes at least one movable locking member for selectively rotationally locking the cam disc to the housing member and, thereby, the sleeve member.

In some such embodiments, no more than one energy mechanism is coupled to the housing member and the cam disc. In some such embodiments, the energy mechanism is configured to deform and thereby produce a preload torque to the cam disc in a first direction upon rotation of the cam disc about the sleeve member in a second direction that substantially opposes the first direction.

In some such embodiments, the cam profile is configured such that at a second angular position of the cam disc each cam slot, and thereby each coupling pin carried therein, is spaced laterally further from the longitudinal axis as compared to a first angular position. In some such embodiments, when the aperture of the sleeve member is aligned with the aperture of the driven part, the cam disc can be rotated about the sleeve member in the second direction to the first angular position and selectively locked thereat by the locking mechanism to preload the torsion spring and bias the cam disc in the first direction, and to position each coupling pin at least partially within the aperture of the driven part to selectively couple the driven part with the driving part via the decoupler. In some such embodiments, the locking member is configured to be translatable by a secondary actuator to disengage from the cam disc and release the preload torque of the energy mechanism to thereby rotate the cam disc in the first direction to the second angular position to laterally translate each coupling pin away from the longitudinal axis such that each coupling pin is removed from the aperture of the driven part to selectively decouple the driven part with the driving part via the actuator decoupler.

In some such embodiments, the at least one coupling pin includes at least one cam pin member, and the at least one cam pin member is carried within a pair of cam slots. In some other such embodiments, the cam members include an even number of pairs of substantially aligned cam slots symmetrically disposed about the longitudinal axis. In some such embodiments, a coupling pin is carried within each pair of cam slots and the aperture of the sleeve member, and the housing member includes at least two locking members symmetrically disposed about the longitudinal axis. In some embodiments, the cam disc includes slots about the periphery of at least one cam member, and the at least one locking member includes a first arm including a protrusion configured to engage a slot of the cam disc. In some such embodiments, the at least one locking member further includes second and third arms longitudinally spaced from one another and configured to receive a secondary actuator therebetween.

In some embodiments, when the driving part and the driven part are selectively decoupled, the driven part is at least rotationally and longitudinally free to translate with respect to the driving part.

In accordance with another aspect of the present disclosure, an actuator decoupler for selectively coupling to an actuation system such that at least a first component of the actuation system is at least rotationally fixed to the actuator decoupler when the actuation system is functioning properly, and for selectively decoupling from at least the first component when a jam occurs in the actuation system such that the first component is capable of rotationally and longitudinally translating with respect to the actuator decoupler is disclosed. In some such embodiments, the actuator decoupler includes a sleeve member, at least one coupling pin, a biasing member, and a locking member.

In some such embodiments, the sleeve member is configured to engage the first component of the actuation system such that at least one aperture of the sleeve member is aligned with at least one aperture of the first component. In some such embodiments, the at least one coupling pin is configured to translate into, and out of, engagement within the at least one aperture of the sleeve member and the at least one aperture of the first component when the first component is engaged with the sleeve member to selectively couple the actuator decoupler to the first component to at least rotationally fix at least the first component of the actuation system to the actuator decoupler.

In some such embodiments, the biasing member is configured to bias the at least one coupling pin out of engagement within the at least one aperture of the first component when the actuator decoupler is selectively coupled to the actuation system. In some such embodiments, the locking member is configured to selectively prevent the biasing member from translating the at least one coupling pin out of engagement within the at least one aperture of the first component when the actuator decoupler is coupled to the actuation system and the actuation system is properly functioning, and selectively allow the biasing member to translate the at least one coupling pin out of engagement within the at least one aperture of the first component when the actuator decoupler is coupled to the actuation system and a jam occurs in the actuation system to decouple the first component from the actuator decoupler such that at least the first component is capable of rotationally and longitudinally translating with respect to the actuator decoupler.

In some such embodiments, the locking member is configured to be responsive to longitudinal movement of a secondary actuator to translate between a first orientation in which the locking member prevents the biasing member from translating the at least one coupling pin and a second orientation in which the biasing member biases the at least one coupling pin and, in response thereto, translates the at least one coupling pin, and wherein the locking member is configured such that translation of the locking member between the first orientation and the second orientation is prevented in any manner other than longitudinal translation of the secondary actuator.

Other objects, aspects and advantages of the actuator decoupler and coupling and decoupling methods of the present invention, and/or of the currently preferred embodiments thereof, will become more readily apparent in view of the following detailed description of the currently preferred embodiments and the accompanying drawings.

BRIEF DESCRIPTION OF THE FIGURES

FIG. 12 is a front side view of an exemplary sleeve member, an exemplary housing member, an exemplary energy mechanism and an exemplary cam disc of the actuator decoupler of FIG. 1;

FIG. 13 is a front side cross-sectional view of an exemplary sleeve member, an exemplary housing member, an exemplary energy mechanism and an exemplary cam disc of the actuator decoupler of FIG. 1 taken along a plane defined by the longitudinal and lateral axes of the sleeve member and a driven part;

DETAILED DESCRIPTION

Figure 1:
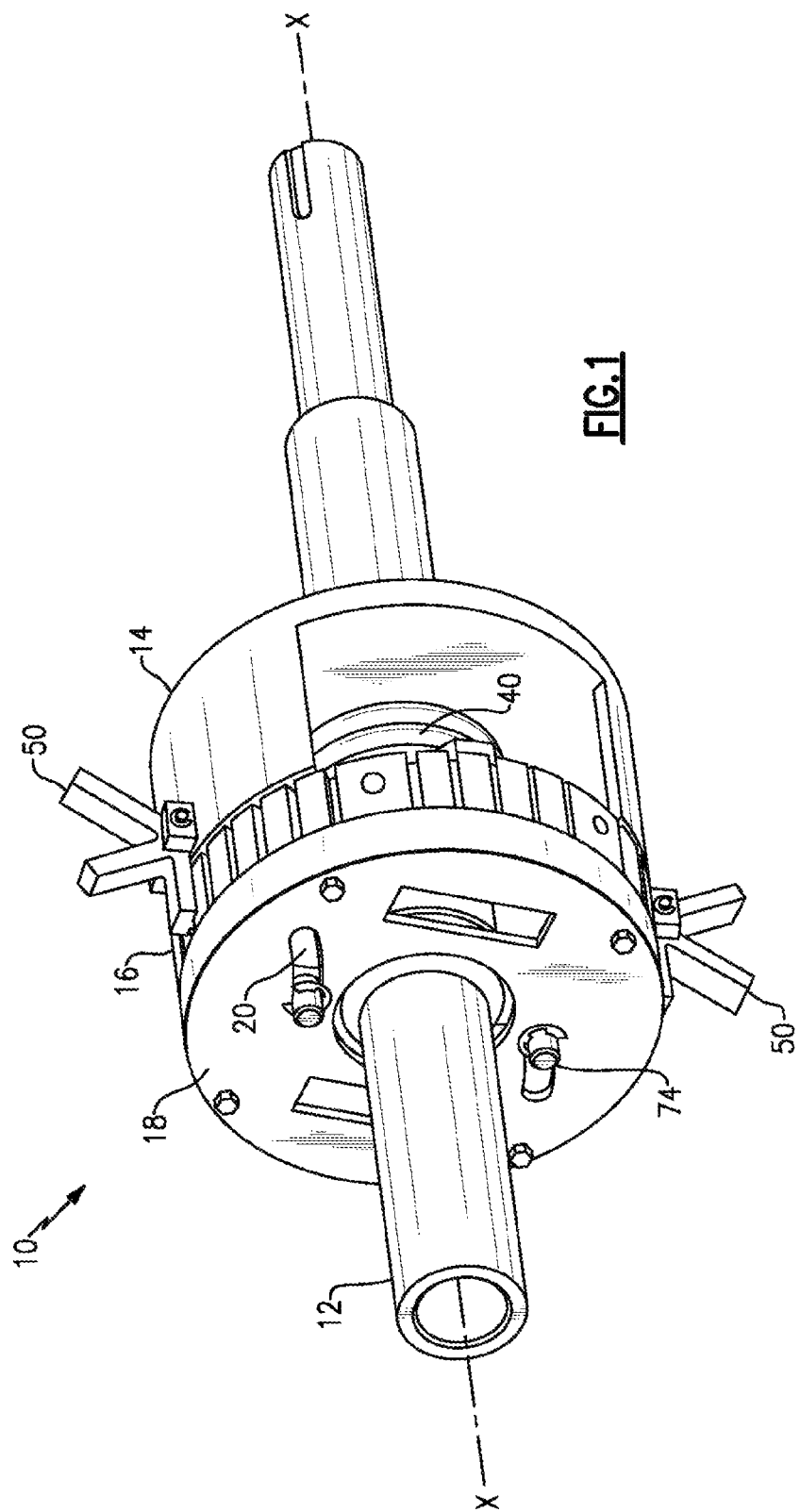
FIG. 1 is a front side elevational perspective view of a first exemplary embodiment of an actuator decoupler.
Figure 2:
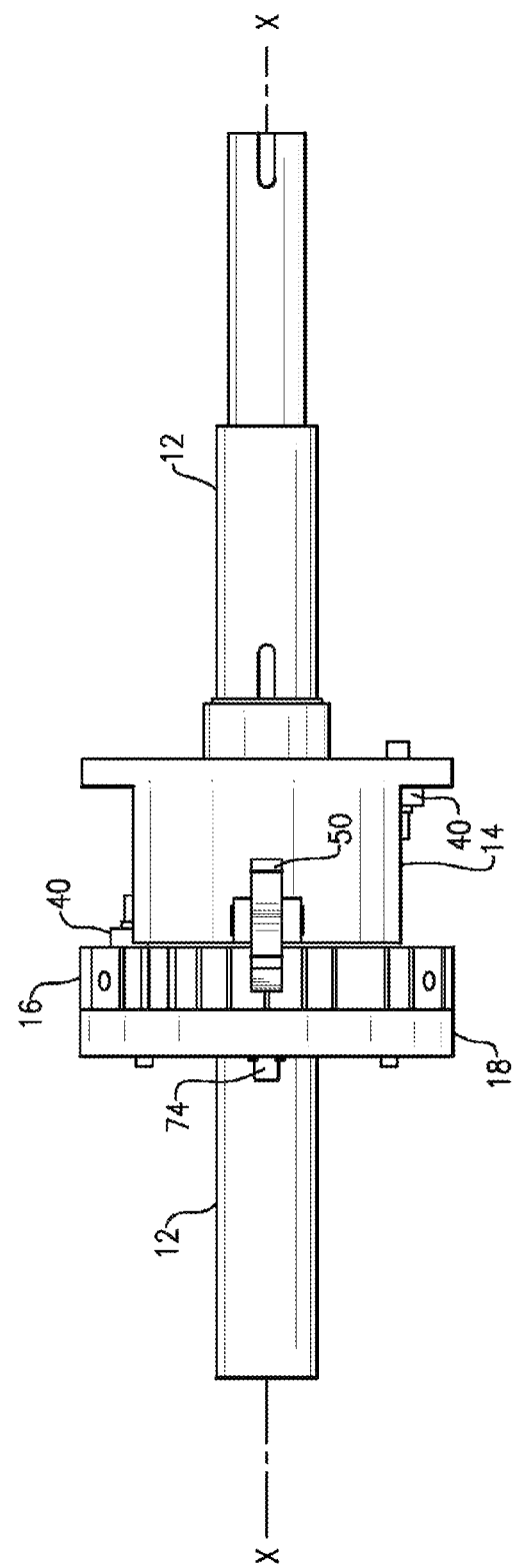
FIG. 2 is a top view of the actuator decoupler implant of FIG. 1.
Figure 3:
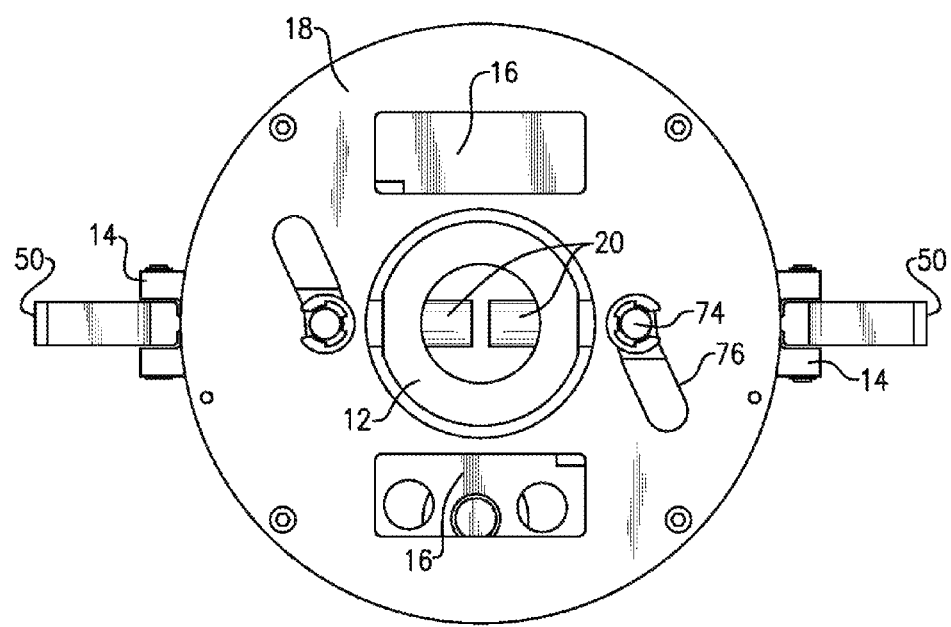
FIG. 3 is a front side view of the actuator decoupler of FIG. 1.

In FIGS. 1-3, an actuator decoupler embodying a first embodiment is indicated generally by the reference numeral 10. As shown in FIGS. 1-3, the exemplary actuator decoupler 10 includes an exemplary sleeve member 12, an exemplary housing member 14, an exemplary cam disc 16, an exemplary cam disc cover 18 and exemplary coupling pins 20. The exemplary actuator decoupler 10 is configured to selectively couple, at least in part, a power source (not shown) and a load recipient (not shown), as explained further below. In this way, in a coupled state the actuator decoupler 10 acts to engage a driving part 30A (i.e., the power source and associated components) with a driven part 30B (see FIGS. 6 and 22) such that they are at least one of rotationally or angularly and longitudinally or axially fixed with respect to one another, and in an uncoupled state the actuator decoupler 10 acts to decouple the driven part 30B from the driving part 30A such that the driven part 30B is free to translate at least both rotationally and longitudinally with respect to the driving part 30A and the actuator decoupler 10. In some embodiments, the actuator decoupler 10 is configured such that in an uncoupled state the driven part 30B is free to translate at least one of rotationally (i.e., angularly) and longitudinally (i.e., axially) with respect to the driving part 30A and the actuator decoupler 10. Thereby, the actuator decoupler 10 can be responsive to a jam in an actuation system in which it is installed to decouple the driven part 30B of the system (and thereby the load recipient) from the actuator decoupler 10 and the driving part 30A to thereby allow the load recipient to properly function, at least in part, in spite of a jam or other malfunction, as explained further below.

The exemplary actuator decoupler 10 utilizes in part the sleeve member 12 to selectively couple the driving mechanism (driving part 30A) and the exemplary actuator decoupler 10 itself to the driven part 30B, and therefore to the load recipient. The configuration of the sleeve member 12 may thereby depend upon the configuration of a particular driving part or mechanism 30A, a particular load application, and a particular driven part 30B and load recipient. For example, the driving part or mechanism 30A, which provides and applies the energy or force that is applied to the actuator decoupler 10, the driven part 30B and, ultimately, the load recipient in the coupled state, may be any drive mechanism known in the art. For example, the actuator decoupler 10 may be used with one or motor or other electric system, hydraulic system, mechanical system, human powered system and combinations thereof as the power source. The driving part or mechanism 30A may also include components that manipulate the output force of the power source. For example, the drive mechanism may include components that alter the magnitude of the output force (e.g., gearing), the direction or type of the output force (e.g., rotational to linear), the timing of the output force (e.g., a switch or clutch), and the like. The driving part 30A may also likely include a mechanism to transfer the output force to the sleeve member 12. For example, the driving part 30A may include one or more gear, belt, pulley, chain or the like to apply the output force of the driving part 30A to the sleeve member 12. As a result, a drive portion or portions 22 of the sleeve member 12 may be configured in any known manner to couple the sleeve member 12 to a driving part or mechanism 30A such that the output force of the driving part or mechanism 30A is transferred, at least partially, to the sleeve member 12. Such a configuration may be achieved through conventional methods commonly and commercially used in the art and may be determined on a routine basis.

As stated above, the directions or type of the output force of the driving part 30A, and thereby applied to the sleeve 12, may vary. As such, the actuator decoupler 10 may be configured to be used in differing types of actuation systems. For example, the actuator decoupler 10 may be used in a liner actuation system in which linear forces are applied to the sleeve 12 by the driving part 30A along the longitudinal axis X-X to "push" and "pull" the sleeve 12 substantially linearly. These longitudinal or axial forces, and resulting motions, may ultimately act to apply longitudinal or axial forces via the actuator decoupler 10 to move a force recipient. Similarly, the actuator decoupler 10 may be used in a rotational actuation system in which torques are applied to the sleeve 12 about the longitudinal axis X-X to rotate the sleeve 12 in clockwise and/or counterclockwise directions. These rotational or angular forces, and resulting motions, may ultimately act to apply rotational or angular forces (i.e., torque) via the actuator decoupler 10 to move a force recipient. As yet another example, the actuator decoupler 10 may be used in actuation systems in which a combination of forces are applied and/or result from actuation. For example, a rotational force (i.e., torque) may be applied to sleeve 12, and such rotation may result in longitudinal forces ultimately acting on the load recipient (and the actuator decoupler 10 via reaction), such as with a power screw. As another example, at least one of rotational forces (i.e., torques) and longitudinal forces may be applied to sleeve 12, and such forces (and resulting movement) may result in at least one of rotational and longitudinal forces ultimately acting on the load recipient (and the actuator decoupler 10 via reaction). Still further, other forces besides rotational and longitudinal forces may be applied to the actuator decoupler by the driving part and/or to the load recipient (and the driven portion or portions 26 of the sleeve 12). Therefore, the driven 22 and driving 26 portions of the sleeve 12 of the actuator decoupler 10 may be configured to receive and transmit any of such forces.

Figure 4:
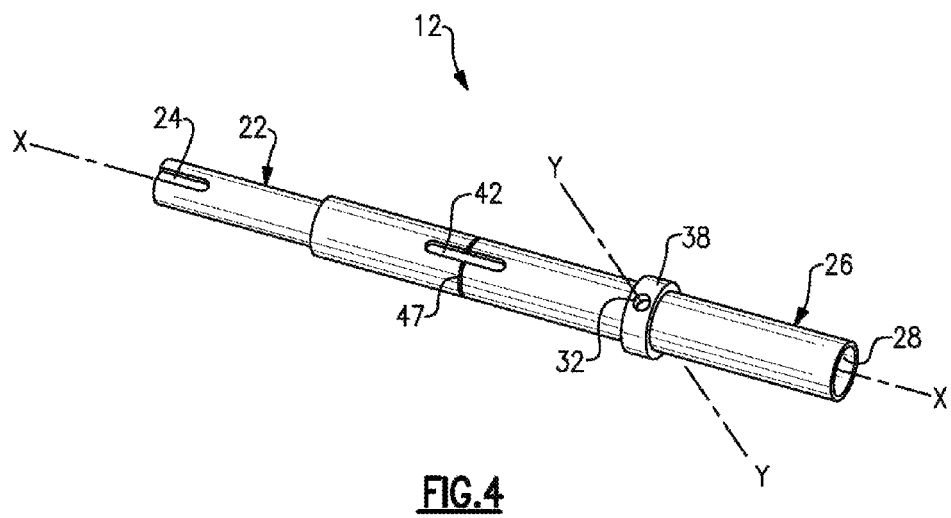
FIG. 4 is a front side elevational perspective view of an exemplary sleeve member of the actuator decoupler of FIG. 1.
Figure 5:
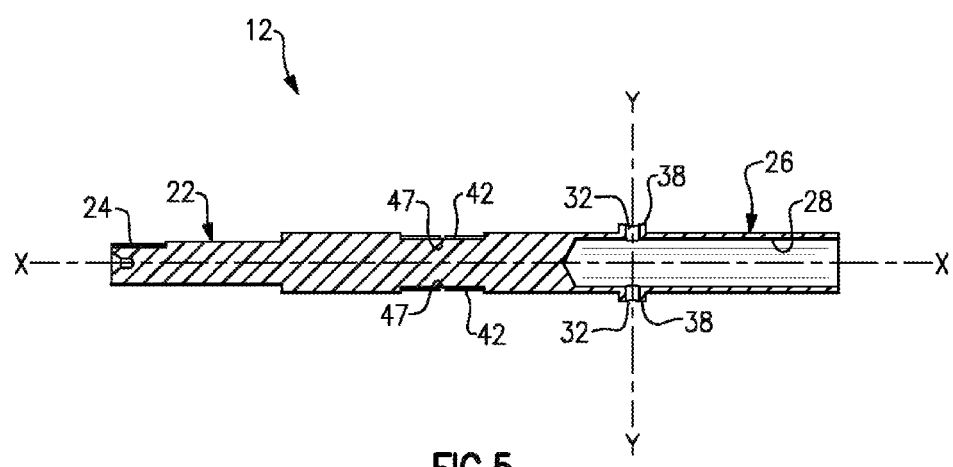
FIG. 5 is a front side cross-sectional view of an exemplary sleeve member of the actuator decoupler of FIG. 1 taken along a plane defined by the longitudinal and lateral axes of the sleeve member.
Figure 6:
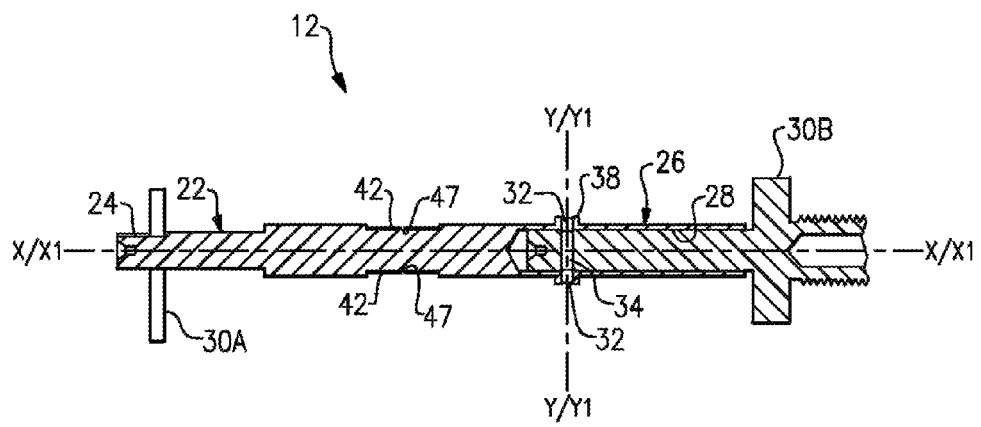
FIG. 6 is a front side cross-sectional view of an exemplary sleeve member of the actuator decoupler of FIG. 1 engaged with an exemplary driving part and an exemplary driven part taken along a plane defined the longitudinal and lateral axes of the sleeve member and the driven part.

As best shown in FIGS. 4-6, the illustrated exemplary sleeve member 12 of the actuator decoupler 10 defines an elongate cylindrical-like shape defining a longitudinal axis X-X. The exemplary sleeve member 12 is configured to rotate about the longitudinal axis X-X, and is therefore formed substantially symmetrically about the longitudinal axis X-X to reduce wobble, vibration or the like during rotation. As a result, the drive portion 22 of the sleeve member 12 is configured to receive a moment or torque about the longitudinal axis X-X such that it rotates thereabout. The drive portion 22 of the sleeve member 12 includes a first detent or flat 24 formed into the outer surface. The first detent or flat 24 can be used to rotationally fix a gear, pulley, sleeve member or other rotational mechanism to the drive portion 22. For example, the first detent or flat 24 may be used in conjunction with a set screw or key and keyway with a gear, pulley, sleeve member or other rotational mechanism that is rotated, either directly or indirectly, from the power source. In such a configuration, the set screw or key and keyway, the rotational mechanism, and the power source may be considered the driving part or mechanism 30A. In this manner, a torque can be applied to the sleeve member 12 via the first portion 22 by the driving part 30A to rotate the sleeve member 12 about the longitudinal axis X-X. The sleeve member 12 may be supported such that the drive portion 22 remains engaged with the drive mechanism during such rotation, such as being restricted from movement in longitudinal or axial and lateral or radial directions. Further, the sleeve member 12 may be supported in such a manner that allows or aids in such rotational movement, such as being supported by bearings about the periphery of the sleeve member 12. However, as explained above, the drive portion 22 of the sleeve member 12 may be alternatively configured depending upon the particular actuation system in which the actuator decoupler 10 is installed, and such configuration may be determined on a routine basis in the art. For example, rather than, or in addition to, a torque and resulting rotational movement, the sleeve member 12 may be subjected to longitudinal force by the driving part 30A that results in longitudinal movement of the sleeve member 12. Thus, in such a configuration, the drive portion 22 of the sleeve member 12 may be configured to receive such longitudinal force and allow for resulting longitudinal movement.

As the configuration of the driving portion or portions 22 of the sleeve member 12 may depend upon, or at least be related to, the particular driving part or mechanism 30A (or vice versa) as described above, the configuration of the driven portion or portions 26 of the sleeve member 12 may depend upon, or at least be related to, the particular driven part or mechanism 30B (or vice versa) of the actuator system in which the actuator decoupler 10 is installed. For example, the driven part 30B may be a mechanism that transfers the force of the sleeve member 12 to the load recipient. For example, the driven part 30B may include one or more shaft, linkage, gear, belt, pulley, chain or any other known mechanism or configuration to receive the output force of the sleeve member 12 (via the driving part 30A) and apply it, at least partially, to the load recipient. As a result, the drive portion or portions 22 of the sleeve member 12 may be configured in any known manner to couple the sleeve member 12 to the driven part or mechanism 30B such that the output force of the sleeve member 12 (via the driving part 30A) is transferred, at least partially, to the driven part or mechanism 30B and, ultimately, to the load recipient. Such configuration may be achieved through conventional methods commonly and commercially used in the art and may be determined on a routine basis.

As the illustrated exemplary sleeve member 12 is configured to receive a moment or torque via the driving portion 22 such that it rotates about the longitudinal axis X-X, the driven portion or portions 26 is/are configured to transfer such a torque to the driven part or mechanism 30B, as shown in FIGS. 4-6. The exemplary driven portion 26 of the sleeve member 12 includes an interior aperture 28 extending longitudinally from an end of the sleeve member 12 about the longitudinal axis X-X such that the axis of the aperture 28 is aligned with the longitudinal axis X-X of the sleeve member 12. The longitudinally extending aperture 28 of the driven portion 26 of the sleeve member 12 defines substantially smooth walls and a circular profile to accept a similarly shaped driven part 30B therein, as shown in FIG. 6. As the sleeve member 12 is configured to receive and translate a torque or moment (via rotation of the sleeve member 12) to the driven part 30B, the longitudinally extending aperture 28 is configured with respect to the to the driven part 30B (or vice versa) such that the driven part 30B can be received and supported within the longitudinally extending aperture 28 and a longitudinal axis X1-X1 of the driven part 30B is aligned with the longitudinal axis X-X of the sleeve member 12. In the illustrated embodiment, the longitudinally extending aperture 28 and the driven part 30B are also configured with respect to one another such that the driven part 30B is able to relatively freely rotate about, and translate along, the longitudinal axes X-X, X1-X1 of the longitudinally extending aperture 28 and the driven part 30B when in an uncoupled state with the actuator decoupler 10, as shown in FIG. 6. As such, the relative diameter, longitudinal length, surface finish and other pertinent characteristics of the longitudinally extending aperture 28 of the driven portion 26 and the driven part 30B are dependent upon, or at least related to, each other such that rotation and longitudinal translation between the two components is achieved in the uncoupled state of the actuator decoupler 10. Such configurations are known in the art and may be achieved through conventional methods commonly and commercially used in the art and may be determined on a routine basis.

The driven portion 26 of the sleeve member 12 may also be configured to allow the sleeve member 12 to be selectively coupled to the driven part 30B. In the illustrated embodiment, as shown in FIGS. 4-7, the driven portion 26 may include at least one laterally or radially extending aperture 32 that extends entirely through the thickness of the portion of the sleeve member 12 about the longitudinally extending aperture 28. As best shown in FIGS. 4 and 5, the exemplary at least one aperture 32 of the illustrated sleeve member 12 extends entirely through the sleeve member 12 and thereby provides two opening s from the exterior of the sleeve member 12 to the interior of the longitudinally extending aperture 28. The at least one aperture 32 of the driven portion 26 of the sleeve member 12 is preferably configured to mate with at least one corresponding laterally or radially extending aperture 34 of the driven part 30B when the driven part is received with the longitudinally extending aperture 28. As such, the configuration, such as the position, orientation, size, shape and quantity, of the at least one aperture 32 of the driven portion 26 of the sleeve member 12 is dependent upon, or at least related to, the corresponding characteristics of the at least one aperture 34 of the driven part 30B (or vice versa).

Figure 7:
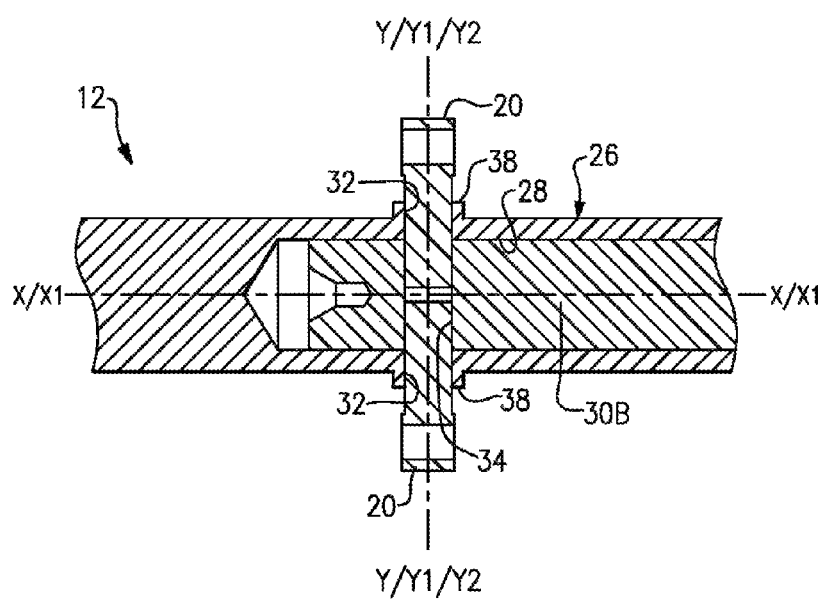
FIG. 7 is a partial front side cross-sectional view of the exemplary sleeve member of the actuator decoupler of FIG. 1 selectively fixed with an exemplary driven part by exemplary coupling pins taken along a plane defined by the longitudinal and lateral axes of the sleeve member and the driven part.

In the illustrated embodiment, as best shown in FIGS. 6 and 7, the at least one laterally extending aperture 32 of the driven portion 26 of the sleeve member 12 extends through the entire thickness of the sleeve member 12 (i.e., the at least one laterally extending aperture 32 intersects the longitudinal axis X-X of the sleeve member 12). Similarly, in the illustrated embodiment the at least one laterally or radially extending aperture 34 of the driven part 30B extends through the entire thickness of the driven part 30B (i.e., the at least one laterally extending aperture 34 intersects the longitudinal axis X1-X1 of the driven part 30B). Further, as shown in FIGS. 5-7, the at least one aperture 32 of the driven portion 26 and the at least one aperture 34 of the driven part 30B are circular, linear (constant diameter) and define respective axes Y-Y, Y1-Y1 that extend substantially perpendicular to the longitudinal axis X-X of the sleeve member 12 and the longitudinal axis X1-X1 of the driven part 30B, respectively. It is noted however, that the particular shape, orientation, position, quantity and the like of the at least one aperture 32 of the driven portion 26 and the at least one aperture 34 of the driven part 30B may vary and be of any configuration that allows the sleeve member 12 and the driven part 30B to be at least rotationally and longitudinally coupled to one another by at least one coupling pin 20 positioned within the apertures 32, 34, as shown in FIG. 7.

As illustrated in FIG. 7, the driven portion 26 of the sleeve member 12 may include a single laterally or radially extending aperture 32 that passes through the sleeve member 12, the longitudinal axis X-X and the longitudinally extending aperture 28 such that two opposing openings are formed in the outer surface of the driven portion 26 of the sleeve member 12. Similarly, the portion of the driven part configured to be positioned within the longitudinally extending aperture 28 of the sleeve member 12 may include a single laterally extending aperture 34 that passes through the driven part 30B and the longitudinal axis X1-X1 such that two opposing openings are formed in the outer surface of the driven portion 26. In such a configuration, as shown in FIG. 7 the axes Y-Y, Y1-Y1 of the apertures 32, 34 can be aligned and a coupling pin 20 can be inserted into the each opening and ultimately, into engagement with the aperture 32 of the driven portion 26 of the sleeve member 12 and the aperture 34 of the driven part 30B.

Thereby, each coupling pin 20 selectively rotationally and longitudinally locks the sleeve member 12 and the driven part 30B to each other (discounting any negligible rotational or longitudinal movement allowed by tolerances between each coupling pin 20 and the apertures 32, 34 of the driven portion 26 of the sleeve member 12 and the driven part 30B). Further, as discussed above, the interaction between the interior surface of the sleeve member 12 that forms the longitudinally extending aperture 28 and the outer surface of the portion of the driven part 30B that is positioned within the longitudinally extending aperture 28 laterally locks the sleeve member 12 and the driven part 30B to one another such that alignment of the longitudinal axes X-X, X1-X1 is maintained. As such, in the illustrated configuration or state of the sleeve member 12, driven part 30B and pins 20 shown in FIG. 7, the sleeve member 12 is selectively coupled to the driven part 30B.

In the illustrated exemplary embodiment, each coupling pin 20 is sized, shaped oriented and otherwise configured to substantially correspond to characteristics of the apertures 32, 34 of the sleeve member 12 and driven part 30B (or vice versa) such that each pin defines a laterally or radially extending axis Y2-Y2. As such, the axis Y2-Y2 of each coupling pin 20 is aligned with the laterally extending axes Y-Y, Y1-Y1 of the apertures 32, 34 of the sleeve member 12 and the driven part 30B, respectively, at least in the coupled state (see FIG. 7).

Figure 8:
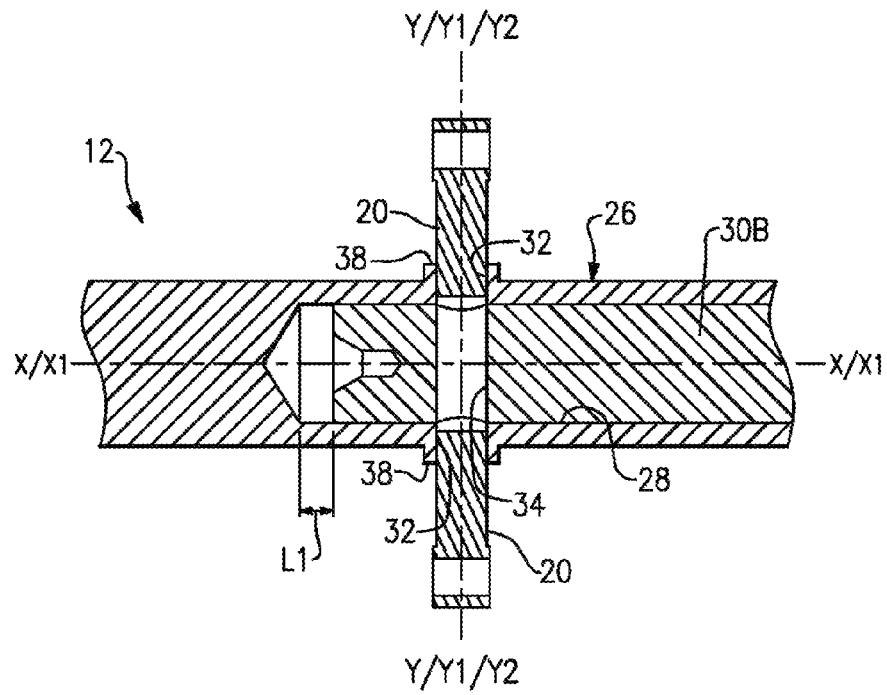
FIG. 8 is a partial front side cross-sectional view of an exemplary sleeve member of the actuator decoupler of FIG. 1 selectively decoupled with an exemplary driven part by exemplary coupling pins taken along a plane defined by the longitudinal and lateral axes of the sleeve member and an exemplary driven part.

In some alternative embodiments (not shown), the actuator decoupler 10 is configured to transmit only one of rotational and longitudinal forces to the driven part 30B. Alternatively, in some embodiments, such as in the illustrated embodiment, the actuator decoupler 10 is configured to be capable of transmitting both rotational and longitudinal forces to the driven part 30B as the actuator decoupler 10 is both rotational and longitudinal fixed or locked to the driven part 30B in the coupled state (FIG. 7). In use, even if the actuator decoupler 10 is configured to transmit both rotationally and longitudinally forces (and/or any other forces) to the driven part 30B, the actuation system in which the actuator decoupler 10 is installed may only transmit one such force to the driven part 30B. In such embodiments, however, the actuation system may alter the direction of the transmitted force, and thereby exert a reaction force that is of different directions or type, such as when the driving part 30A applies a torque to the sleeve 12 and the sleeve 12 and the at least one coupling pin 20 receive a longitudinal reaction force from the driven part 30B when the driven part 30B is a component of, or coupled to, a power screw (i.e., reactionary longitudinal and rotational forces verse transmitted rotational forces). In contrast to the selectively coupled or locked state or configuration of the illustrated sleeve member 12 and driven part 30B shown in FIG. 7, FIG. 8 illustrates a selectively decoupled or unlocked state or configuration of the actuator decoupler 10. As shown in FIG. 8, each coupling pin 20 may be laterally translated such that the each coupling pin 20 is drawn out of engagement with the aperture 34 of the driven part 30B. In such a configuration, the driven part 30B is free to translate both rotationally about, and longitudinally along, the longitudinal axis X1-X1. In alternative embodiments (not shown), the driven part 30B may be free to translate only rotationally, only longitudinally, or in a combination of rotational, longitudinal and other directions.

As explained above, in the uncoupled state of the exemplary illustrated actuator decoupler 10, as shown in FIG. 8, the driven part 30B is supported by the longitudinally extending aperture 28 of the sleeve member 12 and is free to rotate about the longitudinal axis X1-X1. Further, as illustrated in FIGS. 6-8 the longitudinally extending aperture 28 of the sleeve member 12, the pin aperture 32 of the sleeve member 12, and the pin aperture of the driven part 30B may be configured such that in an uncoupled state the driven part 30B is capable of translating longitudinally in either longitudinal direction along the longitudinal axis X1-X1. As indicated in FIG. 8, the pin apertures 32, 34 of the driven portion 26 of the sleeve member 12 and the driven part 30B may be positioned such that when the driven part 30B is positioned within the longitudinally extending aperture 28 of the sleeve member 12 such that the axes Y-Y, Y1-Y1 are aligned, a spacing or gap of a predetermined longitudinal length L1 is provided between the ends of the driven part 30B and the longitudinally extending aperture 28. The predetermined length L1 of the spacing between the ends of the driven part 30B and longitudinally extending aperture 28 of the sleeve member 12 will depend upon the particular application (i.e., will depend upon how much longitudinal translation is required based on the particular actuation system in which the actuator decoupler is installed). In such an arrangement, when the actuator decoupler 10 translates or drives each pin 20 from the coupled state with the driven part 30B (FIG. 7) to the uncoupled state (FIG. 8), the driven part 30B (or the sleeve member 12) can translate a distance L1 in a direction such that the driven part 30B is positioned deeper within the longitudinally extending aperture 28 of the driven portion 26 of the sleeve member 12. The arrangement of the components thereby prevents the driven part 30B from "bottoming out" in the longitudinally extending aperture 28 during longitudinal translation. Further, due to the overall length of the internal longitudinally extending aperture 28 of the sleeve member 12, the driven part 30B can translate to a position where the driven part 30B is more shallow while remaining in the longitudinally extending aperture 28 and, therefore, supported thereby. Stated differently, the sleeve member 12 and the driven part 30B can be configured such that a predetermined degree of longitudinal translation of the driven part 30B (or the sleeve member 12) is provided, within the longitudinally extending aperture 28 for example, when the actuator decoupler 10 decouples the driven part 30B from the sleeve member 12 (and thus the driving part 30A). However, in alternative embodiments (not shown), the actuator decoupler 10 may be configured to not allow longitudinal movement in the uncoupled state.

As also shown in FIG. 8, in a decoupled state each coupling pin 20 may be withdrawn from the driven part 30B and the longitudinally extending aperture 28 of the sleeve member 12, but a portion thereof may remain in the thickness of the sleeve member 12. The complete removal of each coupling pin 20 from the longitudinally extending aperture 28 may be advantageous as the driven part 30B can freely rotationally and longitudinally translate within the longitudinally extending aperture 28 without interacting with each coupling pin 20. As such, each coupling pin 20 and the driven part 30B are prevented from scratching, deforming, rubbing or otherwise damaging each other, and each coupling pin 20 is prevented from catching or otherwise interacting with the aperture 34 of the driven part 30B and, thereby, inhibiting movement of the driven part 30B in any manner. Further, by remaining within the aperture 32 of the sleeve member 12, each coupling pin 20 can be easily inserted, or reinserted, into the coupling pin aperture 34 of the driven part 30B when the aperture 34 is aligned with each coupling pin 20 and the aperture 32 of the sleeve member 12 to couple the sleeve member 12 (and therefore the actuator decoupler 10) and the driven part 30B. Stated differently, to move from an uncoupled state to a coupled state, each coupling pin 20 of the actuator decoupler 10 need only to be aligned with the pin aperture 34 of the driven part 30B and then translated into engagement therein (i.e., each coupling pin 20 does not need to be aligned with the aperture 32 of the sleeve member 12).

The thickness of the sleeve member 12 extending between the surface of the longitudinally extending aperture 28 and the outer surface of the portion 38 of the driven portion 26 of the sleeve member 12 about the laterally or radially extending coupling pin aperture 32 may depend upon the load requirements of the particular application of the actuator system in which the actuator decoupler 10 is installed. For example, in order to drive or translate the driven part 30B (and ultimately the load recipient), a load must be transferred from the sleeve member 12 (via the driving part 30A) to the driven part 30B. Similarly, in some applications, the load recipient may apply a relatively large load to the driven part 30B, and thereby to the sleeve member 12. In the illustrated embodiment, these forces are translated from the sleeve member 12 to the driven part 30B, or vice versa, through the interaction of each coupling pin 20 and the interior surfaces of the lateral aperture 32 of the sleeve member 12. As such, the relative dimensions of the sleeve member 12 (as well as the driven part 30B) and each coupling pin 20, including the thickness of the interior surfaces of the lateral aperture 32 and the number of coupling pins 20, may depend, at least in part, upon the load characteristics of the particular actuation system in which the actuator decoupler 10 is installed. In the illustrated embodiment, as shown in FIGS. 4-8, the thickness of the driven portion 26 of the sleeve member 12 about the aperture 32 is increased as compared to adjacent portions of the sleeve member 12 to provide a collar or raised portion 38 about the aperture 32, and therefore larger interior surface area of the aperture 32, to interact with each coupling pin 20. Further, two coupling pins 20 are provided so that the forces or load acting on each coupling pin 20 and each portion of the sleeve member 12 of the lateral or radial aperture 32 interacting with the coupling pins 20 formed by the collar 38, is reduced by half as compared to the forces or load that would be present if one coupling pin 20, instead of two coupling pins 20, was provided.

To further account for the forces exerted on each coupling pin 20 and the sleeve member 12, the portion of the sleeve member 12 about the aperture 32 (i.e., the collar 38) may be configured such that the outer surface of the sleeve member 12 are flat or "squared-off", as opposed to radiused, as shown best in FIG. 4. In such a configuration, the surface area of the interior surfaces of the lateral or radial coupling pin aperture 32 of the sleeve member 12 at the exterior of the sleeve member 12 that engage each coupling pin 20 when each coupling pin 20 is inserted within the lateral coupling pin aperture 32 in the coupled state or condition of the actuator decoupler 10 is constant about all sides of the pin. Stated differently, because the openings of the coupling pin aperture 32 are flat and oriented such that a plane defined by the openings is normal to the lateral or radial axis Y-Y of the aperture 32 (and therefore the lateral axis Y2-Y2 of each coupling pin 20), the outer edge of the joint between the outer surfaces of each coupling pin 20 and the interior surfaces of each opening of the lateral coupling pin aperture 32 extends about the same lateral location of each coupling pin 20. In comparison to a configuration where the portion of the sleeve member 12 that forms the openings of the coupling pin aperture 32 is cylindrical, and therefore defines a radiused or curved shape about the longitudinal axis X-X, the longitudinal or axial sides of the 32 would extend further from the longitudinal axis X-X as compared to the lateral or radial sides. As such, each coupling pin 20 and the lateral coupling pin aperture 32 of the sleeve member 12 would tend to wear non-uniformly and be more prone to failure (e.g., deformation or breakage of a coupling pin 20, deformation or breakage of the sleeve member 12 bout the coupling pin aperture 32 or a scenario such that a coupling pin 20 is "stuck" in engagement with the coupling pin aperture 32). Further, if each coupling pin 20 is configured such that the bottom of each coupling pin 20 is planar and oriented normal to the axis Y2-Y2 of each coupling pin 20, as each coupling pin 20 is removed from the coupling pin aperture 32 each coupling pin 20 would gradually disengage from the coupling pin aperture 32, and thereby cause portions of the aperture 32 and pin to experience greater loads and resulting wear, deformation or otherwise interfere with the removal of each coupling pin 20. In contrast, in the illustrated configuration, because the portion 38 of the sleeve member 12 about the coupling pin aperture 32 is planar and oriented such that a plane defined by the openings is normal to the lateral or radial axes Y-Y, Y2-Y2 of the lateral pin aperture 32 and each coupling pin 20, and the bottom surface of each coupling pin 20 is planar and oriented normal to the axis Y2-Y2 of each coupling pin 20, all surface areas or sides of each coupling pin 20 disengage from the coupling pin aperture 32 at the same time as the coupling pin 20 is translated out of engagement with the lateral coupling pin aperture 32 coupling pin 20. Further, such a configuration may aid in initially translating each coupling pin 20 into engagement with the lateral coupling pin aperture 32 of the sleeve member 12 through the openings of the lateral coupling pin aperture 32.

The configuration or characteristics of the sleeve member 12, lateral or radial coupling pin aperture 32 and coupling pins 20 may further depend upon other variables, such as the material properties of the components, as known in the art. As such, the configuration or characteristics of the sleeve member 12, lateral coupling pin aperture 32 and coupling pins 20 may be determined through conventional methods commonly and commercially used in the art and may be determined on a routine basis. It is noted, however, that as the number of coupling pins 20 the actuator decoupler 10 includes decreases, the reliability of the actuator decoupler 10 increases, but the load applied to each coupling pin 20 and the associated structures of the actuator decoupler 10 increases, such as the portion 38 of the driven portion 26 of the sleeve member 12 about each pin aperture 32. As such, in applications which require a high level of reliability, such as in aviation applications, it is advantageous for the actuator decoupler 10 to include relatively few coupling pins 20, and such coupling pins 20 and the associated structures of the actuator decoupler 10 to be configured to withstand the relatively large forces or loads applied thereto. Further, such an actuator decoupler 10 must be configured to overcome such large forces or loads to translate each lateral coupling pin aperture 32 out from the lateral coupling pin aperture 34 of the driven part 30B to decouple the driven part 30B from the actuator decoupler 10 and the driving part 30A. To this end, the illustrated actuator decoupler 10 includes two pins 26, the portion of the driven part 26 of the sleeve member 12 about the aperture 32 is enlarged and the actuator decoupler 10 is otherwise configured to overcome the relatively large forces or loads applied to the coupling pins 20 to translate each lateral coupling pin 20 out of engagement with the lateral coupling pin aperture 32 of the driven part 30B, as described further below.

In the illustrated embodiment, the actuator decoupler 10 is particularly well suited for rotation about the longitudinal axis X-X as described above, and therefore is particularly well suited for use with a power screw. For example, as shown in FIG. 6 the exterior of the driven part 30B may include external threading for interaction with internal threading of a complimentary component (or vice versa). As such, in some embodiments, the driven part 30B may be a first component of a power screw. In other embodiments, the driven portion 30B may be a first component of an actuation system that does not include a power screw. In actuation systems including a power screw and the driven part 30B is a first component of the power screw, the torque and resulting rotational movement of the driven part 30B applied by each coupling pin 20 via the sleeve member 12 can be converted into liner force and movement. As a result, when the actuator decoupler 10 is in the coupled state shown in FIG. 7 and a torque is applied to the driving portion 22 of the sleeve member 12, the sleeve member 12 rotates about the longitudinal axis X-X and the interior surfaces of the lateral coupling pin aperture 32 of the driven portion 26 of the sleeve member 12 proportionally apply the torque to each coupling pin 20. In such a state, each coupling pin 20 transfers the force (torque) to the interior surfaces of the lateral coupling pin aperture 34 of driven part 30B to rotate the driven part 30B about the longitudinal axis X1-X1. If the driven part 30B is configured as a component of a power screw, the rotational energy (i.e., torque) of the driven part 30B is transferred into linear energy and, ultimately, applied to a load recipient. In such an arrangement, for example, the load recipient may be a flight control surface of an aircraft. As is known in the art, if the driven part 30B is part of, or at least downstream from, a power screw or other rotational-to-axial motion or energy converting mechanism, axial forces acting generally in the direction of the longitudinal axis X1-X1 will be applied to the driven part 30B. Further, external forces applied to the load recipient will result in additional axial forces acting generally in the direction of the longitudinal axis X1-X1 to the driven part 30B. For example, if the load recipient is a flight control surface of an aircraft, air pressure acting on the control surface will be transferred through a rotational-to-axial motion or energy converting mechanism (e.g., a power screw) and, ultimately, to the driven part 30B.

In scenarios where the actuator decoupler 10 is coupled to a driven part 30B as part of an actuation system that produces both rotational or angular and longitudinal or axial forces, as described above for example, the coupling pins 20 will be subjecting to such forces. Specifically, in such a configuration each coupling pin 20 will be subjected to a shear stress resulting from the forces of the interior surface of the lateral coupling pin aperture 32 of the sleeve member 12 acting on the outer surface of each coupling pin 20 due to the torque of the sleeve member 12, and reaction forces of the interior surface of the pin aperture 34 of the driven part 30B acting on an opposing outer surface of each coupling pin 20 as compared to the forces exerted by surfaces of the lateral coupling aperture 32 of the sleeve member 12. Similarly, each coupling pin 20 will be subjected to a shear stress resulting from the forces of the interior surface of the lateral coupling pin aperture 34 of the driven part 30B acting on the outer surface of each coupling pin 20 due to linear forces of the driven part 30B, and reaction forces of the interior surface of the coupling pin aperture 32 of the sleeve member 12 acting on an opposing outer surface of each coupling pin 20 as compared to the forces exerted by surfaces of the pin aperture 34 of the driven part 12. As such longitudinal or axial forces act generally along the longitudinal axes X-X, X1-X1 of the sleeve member 12 and the driven part 30B, and such rotational forces (i.e., torque) about the longitudinal axes X-X, X1-X1, the forces of the lateral coupling pin aperture 32 of the sleeve member 12 act on adjacent surfaces of each coupling pin 20, and the forces of the lateral coupling pin aperture 34 of the driven part 30B act on opposing adjacent surfaces of each coupling pin 20. As a result, a relatively large surface area about the periphery of each coupling pin 20 is subjected to forces. As is known in the art, such forces acting on the outer surface of each coupling pin 20 by the sleeve member 12 and driven part 30B increase any frictional forces between each coupling pin 20 and the sleeve member 12 and the driven part 30B. To overcome such frictional forces and translate each coupling pin 20 from engagement within the lateral coupling pin aperture 32 of the driven part 30B (the coupled state or position shown in FIG. 7) to a configuration where each coupling pin 20 is removed from within the lateral coupling pin aperture 34 of the driven part 30B and the longitudinally extending internal aperture 28 of the sleeve member 12 (the uncoupled state or position shown in FIG. 8), and thereby allow the driven part 30B to translate both rotationally and longitudinally independent of the actuator decoupler 10 and the driven part 30B, the illustrated exemplary actuator decoupler 10 includes a single (i.e., no more than one) preloaded energy mechanism or resilient member 40. However, in alternative embodiments (not shown) the actuation decoupler includes more than one preloaded energy mechanism 40 (or more than one energy mechanism 40 that can be preloaded).

As shown in FIGS. 1-3, the illustrated exemplary actuator decoupler 10 includes an exemplary housing member 14. The exemplary housing member 14 may be a component or part of the preloaded energy mechanism 40 which drives each coupling pin 20 out of engagement with the driven part 30B to decouple the driven part 30B from the actuator decoupler 10 and the driving part 30A. In reference to FIGS. 9 and 10, the exemplary housing member 14 may be coupled, connected or otherwise attached with, or part of, the sleeve member 12 such that it rotates with the sleeve member 12 about the longitudinal axis X-X in unison with the sleeve member 12 itself. For example, the exemplary housing member 14 (and/or the sleeve member 12) may be configured to engage with the outer surface of the sleeve member 12 such that the housing member 14 is rotationally or angularly locked with respect to the sleeve member 12. As such, the housing member 14 and/or sleeve member 12 may be configured in any known manner such they are either monolithic or coupled, attached, connected or otherwise rotationally locked with respect to one another. In the illustrated embodiment, as best shown in FIG. 10, the sleeve member 12 and the housing member 14 are rotationally locked to one another via a key joint. More specifically, a collar portion 38 of the sleeve member 12 adjacent the lateral or radial coupling pin aperture 32 includes a second detent or flat 42 formed into the outer surface, the housing member 14 includes a keyway 48 in the interior portion of the housing member 14 adjacent the second detent 42, and a key 44 is positioned within the second detent 42 and keyway 48. The second detent 42 of the sleeve member 12, the keyway 48 of the housing member 14 and the key 44 extend generally longitudinal in the direction of the longitudinal axis X-X, and include substantially planar surfaces. In the securely fixedly coupled configuration of the sleeve member 12 and housing member 14 shown in FIGS. 10 and 11, the bottom and longitudinal side surfaces of the key 44 interact with corresponding surfaces of the second detent 42 of the sleeve member 12, and the top and longitudinal side surfaces of key 44 interact with the keyway 48 of the housing member 14. In this manner, a torque can be applied to the sleeve member 12 via the first portion 22 by the driving part 30A to rotate the sleeve member 12 and the housing member 14 via the key 44 about the longitudinal axis X-X.

The actuator decoupler 10 may also be configured such that the housing member 14 is securely prevented from longitudinal translation along the sleeve member 12 (e.g., translation along the longitudinal axis X-X). For example, the sleeve member 12 and/or housing member 14 may be configured such that the housing member 14 is longitudinally locked with respect to the sleeve member 12. The housing member 13 and/or sleeve member 12 may be configured in any known manner such they couple to one another and are longitudinally or axially locked with respect to one another. In the illustrated embodiment, as shown best in FIG. 10, a washer 46 may be coupled to the sleeve member 12 and extend about the sleeve member 12 and the second detents 42. As best seen in FIGS. 4-6, the sleeve member 12 may include a groove or channel 47 in which the washer 46 can be partially inserted (see FIG. 10). In such an arrangement, the washer 46 is longitudinally fixed to the sleeve member 12. The longitudinal positioning of the groove 47 and washer 46 is configured such that the key 44 is secured between the washer 46 and a longitudinal side surface of the second detent 42, thereby restricting longitudinal movement of the key 44 towards the driving portion 22. Further, as the washer 46 extends about the periphery of the sleeve member 12 and not only about the second detents 42, the washer 46 abuts the housing member 14 and thereby restricts longitudinal movement of the housing member 14 towards the driving portion 22. As explained further below, a cam disc 16 can be coupled to the housing member 14 on the side of the housing member 14 that opposes the washer 46. The housing member 14 and the cam disc 16 can be configured such that the side of the cam disc 16 that faces the driven portion 26 abuts the collar or raised portion 38 about the lateral coupling pin aperture 32 of the sleeve member 12. In this way, the housing member 14 (and the cam disc 16) is positioned between the washer 46 and the collar 38 such that longitudinal movement of the housing member 14 (and the cam disc 16) along the sleeve member 12 (i.e., along the longitudinal axis X-X) is restricted or substantially prevented. Stated differently, the sleeve member 12 and housing member 14 may be configured such that the housing member 14 is longitudinally fixed to the sleeve member 12. Thereby, in the illustrated embodiment, the housing member 14 is rotationally fixed to the sleeve member 12 via the second detent 42, key 44 and keyway 44, and longitudinally fixed to the sleeve member 12 via the groove 47, washer 46, collar 38 and cam disc 16.

Figure 9:
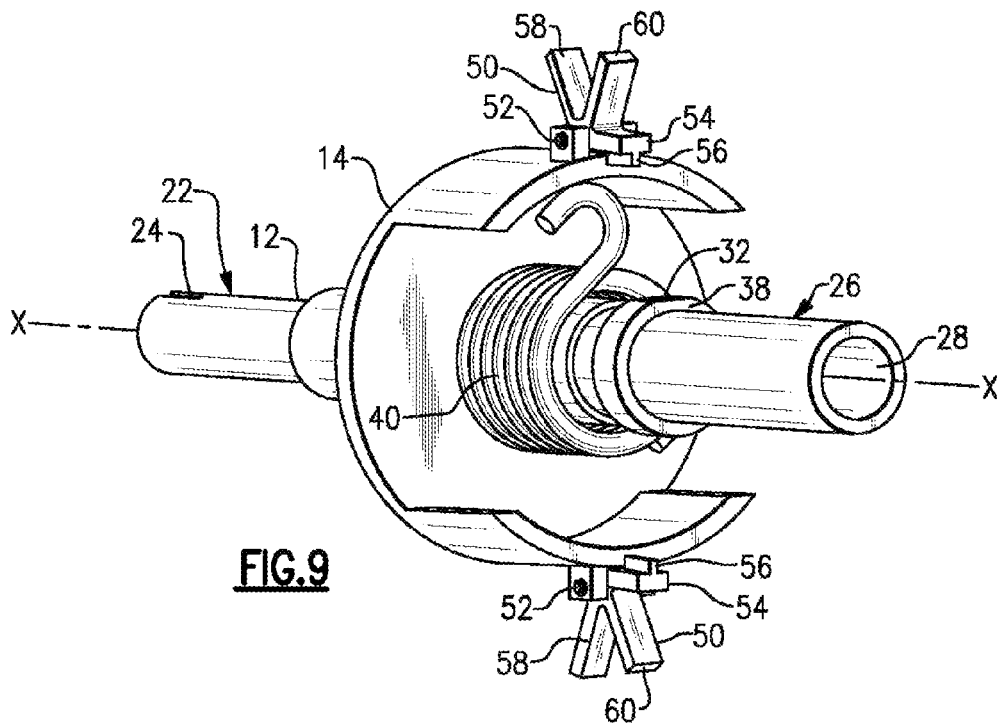
FIG. 9 is a front side elevational perspective view of an exemplary sleeve member, an exemplary housing member and an exemplary energy mechanism of the actuator decoupler of FIG. 1.
Figure 10:
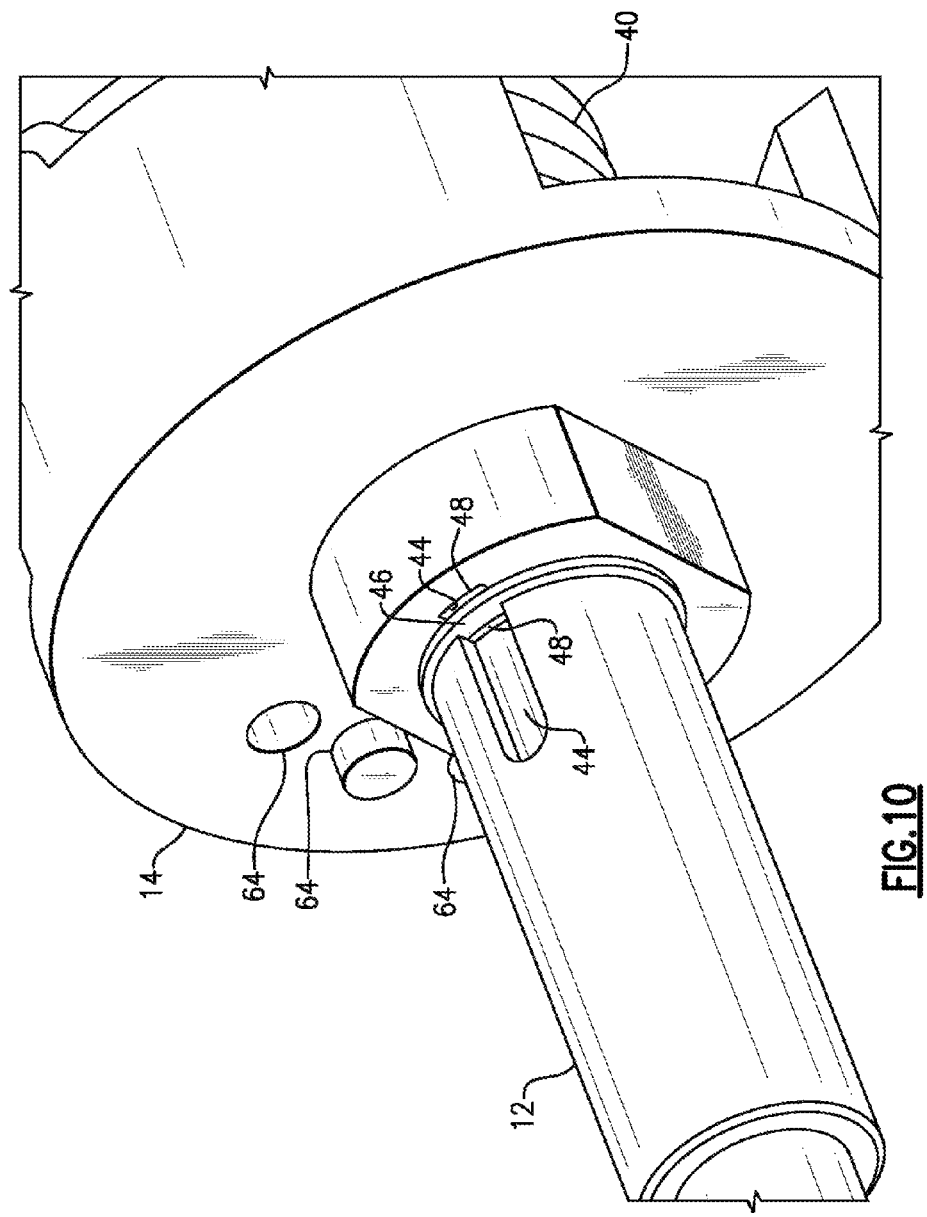
FIG. 10 is a partial rear side elevational perspective view of an exemplary sleeve member, an exemplary housing member and an exemplary energy mechanism of the actuator decoupler of FIG. 1.

As shown in FIG. 9, the housing member 14 may be configured to support, at least partially, an energy mechanism 40 used to decouple the sleeve member 12, and thereby the actuator decoupler 10, from the driven part 30B by removal of each coupling pin 20 from the lateral coupling pin aperture 34 of the driven part 30B. The energy mechanism 40 may be any known energy mechanism, such as any mechanism known for providing energy, storing energy, releasing energy, being preloaded and combinations thereof. For example, the energy mechanism 40 may be an energy mechanism capable of being coupled to the housing member 14 and resiliently deformed or otherwise preloaded to store energy that can be released upon actuation at least partially, by the actuator decoupler 10. Further, the quantity of the members or elements comprising the energy mechanism 40 may vary. The amount of energy capable of being stored and provided by the mechanism making up the energy mechanism 40 may be determinative of the quantity of such mechanisms 40. For example, a particular application of the actuator decoupler 10 may dictate the necessary quantity of energy needed to remove each coupling pin 20 from the pin aperture 34 of the driven part 30, and therefore the amount of energy elements required such that the energy mechanism 40 is capable of providing the necessary preloaded energy to remove each coupling pin 20 from the coupling pin aperture 34. It is noted however, that the fewer the energy elements making up the energy mechanism 40, the more reliable the energy mechanism 40 and, thereby, the actuator decoupler 10. To this end, the illustrated energy mechanism 40 is comprised on a single helical resilient spring (i.e., a single energy element) capable of providing an amount of stored energy that is sufficient to translate each coupling pin 20 out of engagement within the lateral coupling pin aperture 34 of the driven part 30B when the driven part 30B is a component of a power screw and the actuator decoupler 10 is installed in an actuation system of a flight control surface of an aircraft.

The illustrated housing member includes a longitudinally extending inner portion about the sleeve member 12, and the energy mechanism or resilient member 40 is provided thereabout, as shown best in FIG. 9. The energy mechanism 40, such as the illustrated exemplary resilient torsion spring, may be configured such that a first portion or end of the energy mechanism 40 can be fixed to the housing member 14, and a second portion or end can be deformed to preload the energy mechanism 40. As shown in FIGS. 9 and 10, the illustrated energy mechanism or torsion spring 40 is configured to mate with a bolt, pin, screw or other known fastening mechanism at both the first and second end or portion of the energy mechanism 40, and the housing member 14 includes a series of energy mechanism apertures 32 at different radial or lateral and/or rotational or angular positions about the longitudinal axis X-X for mating with the fastening mechanism. In such a configuration, the housing member 14 is configured to accept energy mechanisms 40 of differing sizes (and thus differing energy potentials) and orientations of the energy mechanism 40, and is thereby customizable based on the load requirements of a particular actuation system in which the actuator decoupler 10 is installed. The fastening of the first end of the energy mechanism 40 to the housing member 14 may rotationally and longitudinally lock the energy mechanism 40 with respect to the sleeve member 12 (except for any rotationally and longitudinally movement caused by deformation of the spring). As explained further below, the second end or portion of the torsion spring, torsion bar or like energy mechanism 40 can be deformed such that it is twisted (e.g., partially unwound or wound) to store mechanical energy in the form of a preloaded torque proportional to the amount it is twisted. It is noted that bending stresses in the torsion spring, torsion bar or like energy mechanism 40 caused by the twisting may result in the preloaded torque or moment force. As also explained further below, because the first portion or end of the energy mechanism 40 is fixedly coupled to the housing member 14, which is at least rotationally and longitudinally fixedly coupled to the sleeve member 12, after twisting the second end of the energy mechanism 40 the second end will rotationally return, at least partially, to its pre-deformed position if the resistance of the mechanism coupled to the second end or portion provides less resistance than the resistance applied to the first end or portion (i.e., the resistance applied by the sleeve member 12 by the driving part 30A and the driven part 30B (in the coupled state)) and the reactionary preloaded torque of the energy mechanism 40 is sufficient to overcome the resistance provided by the mechanism coupled to the second end or portion.

Figure 11:
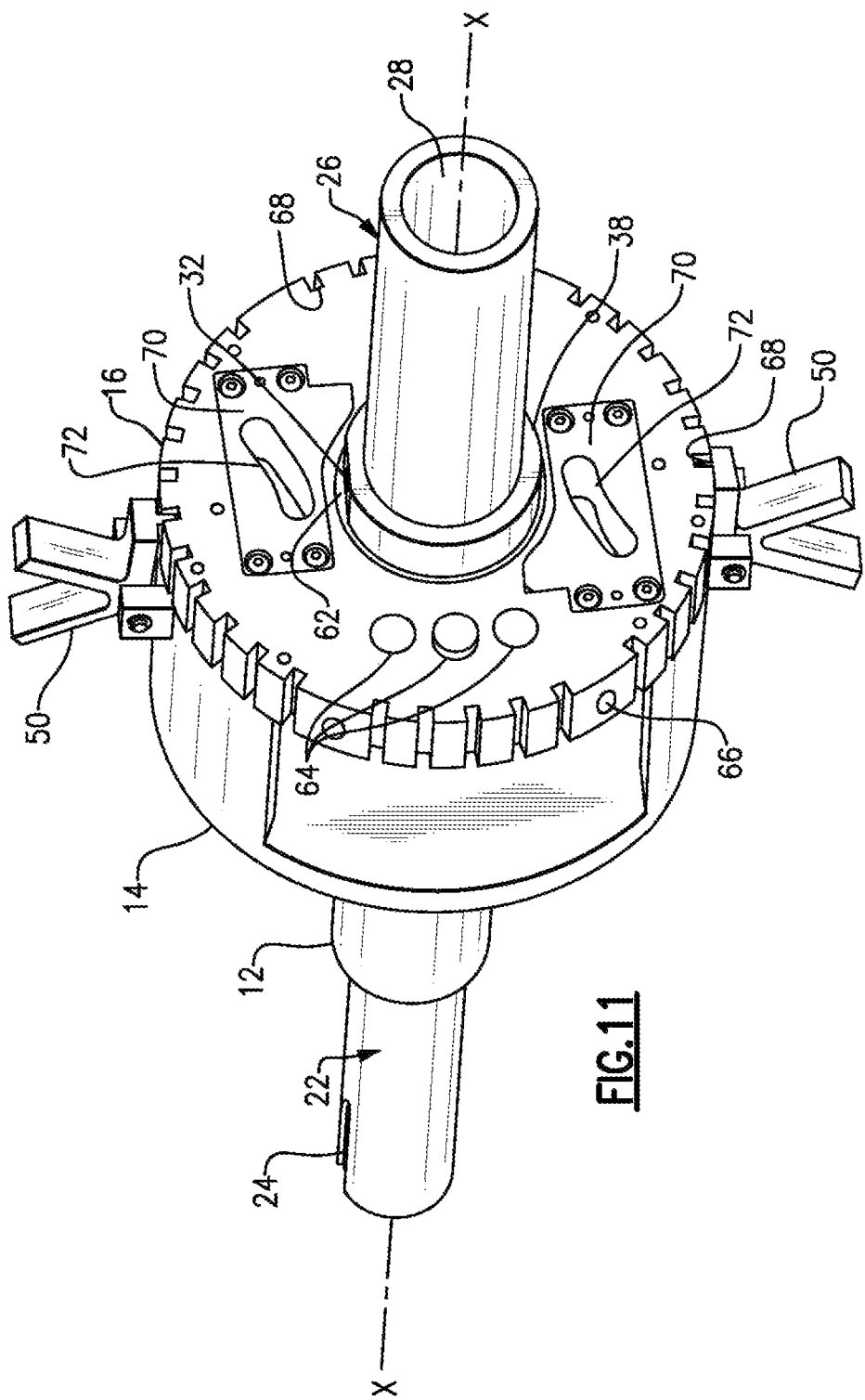
FIG. 11 is a front side elevational perspective view of an exemplary sleeve member, an exemplary housing member, an exemplary energy mechanism and an exemplary cam disc of the actuator decoupler of FIG. 1.

As shown in FIGS. 11-13 and briefly discussed above, a cam disc 16 may be positioned about the sleeve member 12 and adjacent the housing member 14 between the housing member 14 and the collar 38 of the sleeve member 12 such that longitudinal translation of the housing member 14 and the cam disc 16 is substantially prevented by the collar 38 and the washer 46. The cam disc 16 may be disc shaped and configured to substantially symmetrically surround the sleeve member 12. In such a configuration, the cam disc 26 may be particularly well suited for rotation with, and about, the longitudinal axis X-X the sleeve member 12. To aid in rotational or angular translation about the sleeve member 12 (and therefore the longitudinal axis X-X), the cam disc 16 may include a bearing mechanism 62 between the inner surface of the cam disc 16 and the outer surface of the sleeve member 12. In such a configuration, as shown in the illustrated embodiment in FIGS. 11 and 13, the friction between the cam disc 16 and sleeve member 12 is reduced as compared to a configuration where the inner surface of the cam disc was in direct contact with the outer surface of the sleeve member 12. Thereby, as further discussed below, the resistance encountered to rotate the cam disc 16 to translate each pin 20 out of the lateral coupling pin aperture 34 of the driven part 30B to decouple the driving part 30A from the actuator decoupler 10 and the driven part 30B is kept to a minimum.

The second end or portion of the energy mechanism 40 may be coupled to the cam disc 16, as shown in FIGS. 12 and 13. In the illustrated embodiment, the cam disc 16 includes a series of energy mechanism apertures 64 at different radial or lateral and/or angular or rotational positions about the longitudinal axis X-X for mating with the fastening mechanism and the second end or portion of the energy mechanism 40. In such a configuration, the housing member 14 is configured to accept energy mechanisms 40 of differing sizes (and thus differing energy potentials) and orientations of the energy mechanism 40 (the position of the second end or portion of the energy mechanism 40 as compared to the position or orientation of the first end for example), and is thereby customizable based on the load requirements of a particular actuation system in which the actuator decoupler 10 is installed.

The configuration of the housing member 14, energy mechanism 40 and cam disc 16 illustrated in FIGS. 11-13 allows the cam disc 16 to be rotated about the sleeve member 12 and longitudinal axis X-X, and therefore rotated with respect to the housing member 14, to twist or otherwise deform the second end or portion of the energy mechanism 40 with respect to the first end or portion to pre-load the energy mechanism 40. To aid in preloading the actuator decoupler 10 (i.e., deforming the energy mechanism 40), the cam disc 16 may include an engageable mechanism 66 to rotate the cam disc 16 about the sleeve member 12 and longitudinal axis X-X to deform the energy mechanism 40. In the illustrated embodiment, as best shown in FIGS. 11 and 12, the cam disc 12 includes apertures 66 extending from the outer surface of the cam disc 16 toward the longitudinal axis X-X. The apertures 66 in the outer surface of the cam disc 16 may be engaged with a lever arm, for example, to assist a user in rotating the cam disc 12 to twist or otherwise deform the energy mechanism 40 to apply the preload force or bias of the actuator decoupler 10.

The actuator decoupler 10 is preferably configured to selectively retain or lock the preloaded condition of the energy mechanism 40 such that a secondary actuator can selectively retain or release the preload to couple or decouple, respectively, the actuator decoupler 10 and the driving part 30A from the driven part 30B, as explained further below. The mechanism or configuration of the actuator decoupler 10 that achieves such selectively retaining and releasing of the preloaded energy of the energy mechanism 40 may take any form know in the art capable of interacting with a secondary actuator. For example, a secondary actuator may be capable of detecting a jam in an actuation system in which the actuator decoupler 10 is installed in the driving part 30A, in the load recipient or otherwise upstream from the actuator decoupler 10, and in reaction to such a jam, release the preloaded energy of the energy mechanism 40 to translate each coupling pin 20 out of engagement within the coupling pin aperture 34 of the driven part 30B to disengage the actuator decoupler 10 and the driving part 30A from the driven part 30B and the rest of the actuation system that is positioned upstream from the actuator decoupler 10. In such a configuration, the driven part 30B may be capable of both rotational or angular translation about, and longitudinal or axial translation along, the longitudinal axis X-X of the sleeve member 12. As is known in the art, when the driven part 30B is decoupled and free to translate (e.g., at least one of angularly and axially) independent of the driving part 30A and a jam is present between the load recipient and the actuator decoupler 10, the load recipient may none-the-less be capable of functioning, at least partially. For example, if the driven part 30B is a component of a power screw, and the load recipient is a flight control surface of an aircraft and is coupled to the power screw, a jam or other malfunction in the power screw mechanism would tend to lockup the actuation system such that movement of the flight control surface would be prevented by the jammed actuation system. Further, the jammed actuation system would prevent other actuation systems coupled to the flight control surface from actuating the flight control surface. However, if the actuator decoupler 10 was installed in the jammed actuation system, the secondary actuator may be capable of detecting the jam and in response thereto trigger the actuator decoupler 10 to disengage the jammed power screw mechanism from the driven part 30B to thereby allow the power screw to longitudinally and/or rotationally translate. Such longitudinal or axial and rotational or angular translation of the power screw would free-up the jam and allow other non-jammed actuation systems coupled to the flight control surface to, at least partially, actuate (e.g., move) the flight control surface. Further, decoupling the driving part 30A from the jammed power screw would prevent the driving part 30A from applying additional destructive loads to the jammed system that would tend to enhance or expand the jam and/or damage other components of the actuation system.

Selective retention and release of the preload of the energy mechanism 40 is achieved in the illustrated embodiment through the use of slots 68 in the outer surface of the cam disc 16 interacting with a protrusion of a locking member or lever arm 50 provided on an outer portion of the housing member 14 that is positioned adjacent to the outer surface of the cam disc 16, as best shown in FIGS. 11, 12 and 14-16. The locking member 50 of the housing member 14 and the slots 68 of the cam disc 16 thereby prevent the cam disc 16 from rotating about the sleeve member 12 and longitudinal axis X-X, and thereby prevent any preloaded torque of the energy mechanism 40 from being released. Thus, the energy mechanism 40 must be preloaded (i.e., deformed) before the cam disc 16 is selectively rotationally fixed to the housing member 14 (and thereby the sleeve member 12) via the locking member 50.

Figure 14:
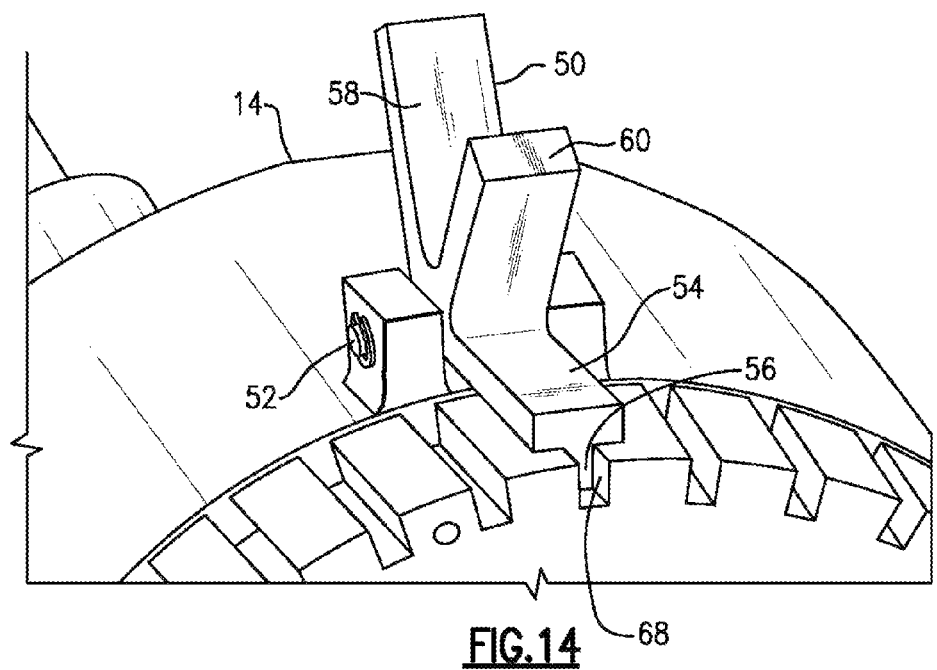
FIG. 14 is a partial front side elevational perspective view of an exemplary housing member and an exemplary cam disc of the actuator decoupler of FIG. 1 in the selectively locked state.
Figure 15:
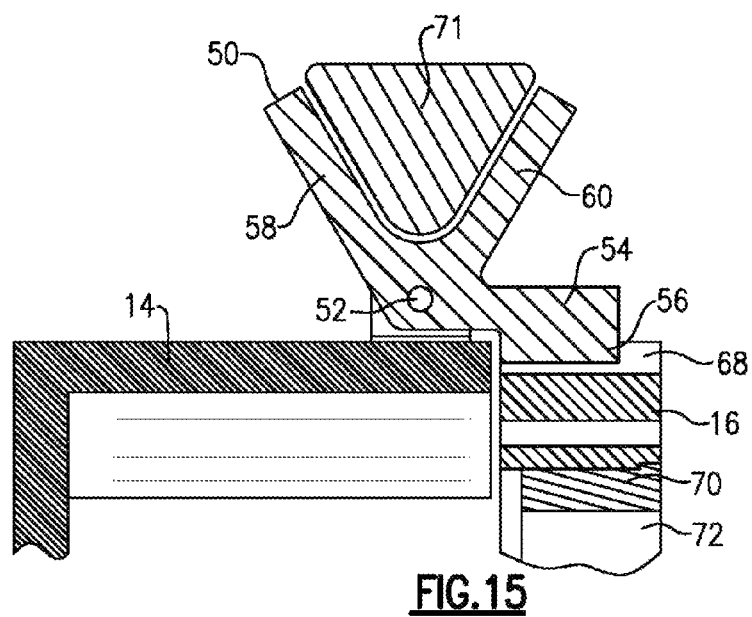
FIG. 15 is a partial front side cross-sectional view of an exemplary housing member and an exemplary cam disc of the actuator decoupler of FIG. 1 in the selectively locked state and interacting with an exemplary secondary actuator.
Figure 16:
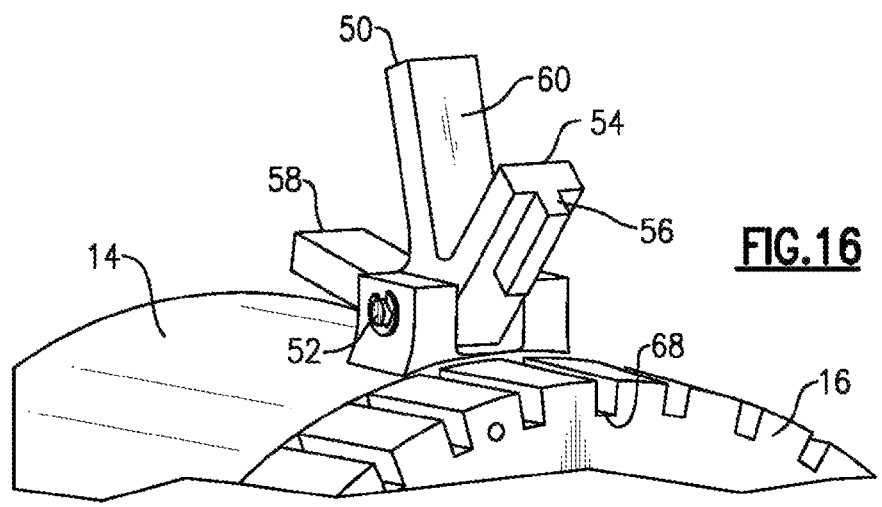
FIG. 16 is a partial front side elevational perspective view of an exemplary housing member and an exemplary cam disc of the actuator decoupler of FIG. 1 in the selectively unlocked state.

As best shown in FIGS. 14-16, the locking member 50 of the illustrated embodiment may be hinged to the housing member 14 via a hinge pin 52 that extends through a portion of the housing member 14 and the locking member 50. The hinge pin 52 thereby represents an axis about which the locking member 50 is capable of pivoting or rotating. The illustrated locking member 50 also includes a first arm 54 that is configured to extend from the portion of the locking member 50 engaging the pin 52 (i.e., the axis of rotation). The lever arm may include a protrusion 56 extending from the first arm 54 configured to mate with the slots 68 provided about the outer surface of cam disc 16. Thereby, the locking member 50 is configured to rotate about the pin 52 into a first orientation such that the protrusion 56 in engaged within a slot 68 of the cam disc 16 as shown in FIGS. 14 and 15, and into a second orientation such that the protrusion 56 is spaced from the slot 68 of the cam disc 16 as shown in FIG. 15. In the first orientation, the cam disc 16 is prevented from rotating with respect to the housing member 14, and therefore the sleeve member 12, because the protrusion 56 of the first arm 54 of the locking member 50 engages the cam disc 16 via a slot 68. The engagement of the protrusion 56 of the first arm 54 of the locking member 50 with a slot 68 of the cam disc 16 can be best seen by the cross-sectional view of FIG. 15 of the illustrated embodiment. In this way, the cam disc 16 of the actuator decoupler 10 can be rotated about the sleeve member 12 such that the energy mechanism 40 is preloaded, and the locking member 50 rotated about the pin 52 to engage the protrusion 56 of the first arm 54 with a slot 68 of the cam disc 16 to lock, fix, retain or otherwise prevent the cam disc 16 from rotating about the sleeve member 12, as shown in FIGS. 14 and 15. To release the preload of the energy mechanism and allow the cam disc to rotate about the sleeve member 12, the locking member 50 can be rotated about the pin 52 to disengage the protrusion 56 of the first arm 54 from the slot 68 to allow the preloaded torque of the energy mechanism 40 to act on the cam disc 16 and rotate the cam disc 16 about the sleeve member 12 and longitudinal axis X-X, as shown in FIG. 16.

As also shown in FIGS. 14 and 16, the cam disc 16 may include numerous slots 68 about the outer surface of the cam disc 16 to provide numerous locations along the outer surface of the cam disc 16 for the locking member 50 to engage, and thereby allow the cam disc 16 to be coupled to the housing member 14 in differing rotational or angular orientations. In such a configuration, the cam disc 16 is configured to function with energy mechanisms 40 of differing sizes (and thus differing energy potentials) and differing orientations of the energy mechanism 40 (and thus differing amounts of preloads), and is thereby customizable based on the load requirements of a particular actuation system in which the actuator decoupler 10 is installed. For example, the more the cam disc 16 is rotated about the sleeve member 12, the more the energy mechanism 40 is deflected and the greater the preload. The angular amount the cam disc 16 is rotated, and therefore the amount of preload achieved, can be customized by engaging the locking member 50 with differing slots 68 about the cam disc 16.

The above-described configuration of the locking member 50 and the cam disc 16 such that the locking member 50 includes the protrusion 56 and the cam disc includes a slot 68 is advantageous over a configuration wherein the locking member 50 includes the slot 68 and the cam disc 16 includes the protrusion 56. For example, machining or otherwise forming the protrusion 56 tends to be more costly and time consuming than machining or otherwise forming the slots 68. As a result, forming only one protrusion 56 on the locking member 50 and multiple slots 68 of the cam disc 16 is cost and time efficient. Further, the preload torque of the energy mechanism 40 will exert a shear stress on the protrusion 56, and therefore the protrusion 56 may develop fatigue and deterioration or other damage over time. Replacement of the illustrated locking member 50 is less expensive and simpler than replacement of the cam disc 16. Thus, providing the protrusion 56 on the locking member 50 as opposed to the cam disc 16 is further cost and time efficient.

The locking member 50 may also include a second arm 58 and a third arm 60 for interaction with a secondary actuator 71 to retain and release, respectively, the first lever arm 54 in engagement with the cam disc, as shown in the illustrated embodiment in FIG. 15. The exemplary locking member 50 includes a second arm 58 and a third arm 60 configured in a "V" shape such that a secondary actuator 71 can be positioned between the second 58 and the third arm 60. In such a configuration, the secondary actuator 71 can act to retain the locking member 50 in the coupled state with the cam disc 16 by preventing the second arm 60 of the locking member 50 from rotating in a direction such that the protrusion 56 of the first arm 54 is disengaged from a slot 68 of the cam disc 16. As shown in FIG. 15, when a secondary actuator 71 is maintained in a positioned located between the second arm 58 and a third arm 60 of the locking member 50 when the locking member 50 is engaged with the cam disc 16, the locking member 50 is prevented from rotation about the pin 52 by the interaction of the third arm 60 and the secondary actuator 71. Thereby, the configuration of the locking member 50 and the secondary actuator 71 prevents accidental or erroneous uncoupling of the cam disc 16 such that the cam disc 16 is able to rotate due to the torque provided by the energy mechanism 40 being accidentally released. In this manner, the actuator decoupler 10 can utilize a secondary actuator 71 to monitor for a jam in the actuation system in which the actuator decoupler is installed, and only release the preload energy of the energy mechanism 40 when a jam is detected. Release of the preload energy due to accidental movement of the lever arm 50, such as from shock or vibration for example, is prevented by the third lever arm 60 and the secondary actuator 71.

If the secondary actuator 71 does detect a jam in the actuation system in which the actuator decoupler 10 is installed, the secondary actuator 71 can be responsive and triggered to translate longitudinally to rotate the locking member 50 about the pin 52 such that the first arm 54 is translated away from the cam disc 16 and the protrusion 56 of the first arm 54 is disengaged from a slot 68 of the cam disc 16, as shown in FIG. 16. More specifically, from the coupled state where the secondary actuator 71 is positioned between the second arm 58 and third arm 60 and the locking member 50 is engaged with a slot 68 of the cam disc 16 (FIG. 15), the secondary actuator 71 can be translated longitudinally to interact with the second arm 58 to rotate the locking member 50 about the pin 52 to translate the protrusion 56 of the first arm 54 out from a slot 68 of the cam disc 16 to rotationally release the cam disc 16 (FIG. 16). In this way, the secondary actuator 71 can actuate the actuator decoupler 10 to release the preload energy (i.e., torque) of the energy mechanism 40 to allow the cam disc 16 to rotate about the sleeve member 12 and, ultimately, translate each coupling pin 20 from the lateral coupling pin aperture 34 of driven portion 30B, as explained further below.

As shown in FIGS. 1, 3, 9 and 11-13, the actuator decoupler 10 may include multiple mechanisms to selectively couple and uncouple the cam disc 16 and the housing member 14 to selectively lock the cam disc 16 from rotation via the preloaded torque of the energy mechanism 40. In the illustrated embodiment, the actuator decoupler 10 includes two diametrically opposed locking members 50 for engagement with slots 68 about the outer surface of the cam disc 16. In such a configuration, the secondary actuator 71 for actuation of the locking members 50, such as the secondary actuator 71 depicted in the cross-sectional view of FIG. 15, may include a ring-shaped member that extends about the actuator decoupler 10 and through the second 58 and third 60 arms of the locking members 50, as described above. The ring-shaped member of the secondary actuator 71 may be coupled to a mechanism that is capable of longitudinally or axially translating the ring member to engage the second arm 58 of the locking member 50 to decouple the cam disc 16 and housing member 14 (and thereby ultimately decouple the actuator decoupler 10 and the driving part 30A from the driven part 30B). For example, the actuator decoupler 10 may include a ring-shaped member for interaction with multiple lever arms 50 coupled to a hydraulic system for longitudinally translating the ring-shaped member to actuate the locking members 50 via the second lever arm 58. In this way, the actuator decoupler 10 can rotate about the longitudinally axis X-X and within the ring-shaped member of the secondary actuator 71. As stated above, however, any known secondary actuation mechanism or system may be used to decouple the cam disc 16 from the housing member 14 and/or sleeve member 12 such that the preloaded torque of the energy mechanism rotates the cam disc 16 to, ultimately, translate each coupling pin 20 from within the lateral coupling pin aperture 34 of the driven part 30B.

Figure 17:
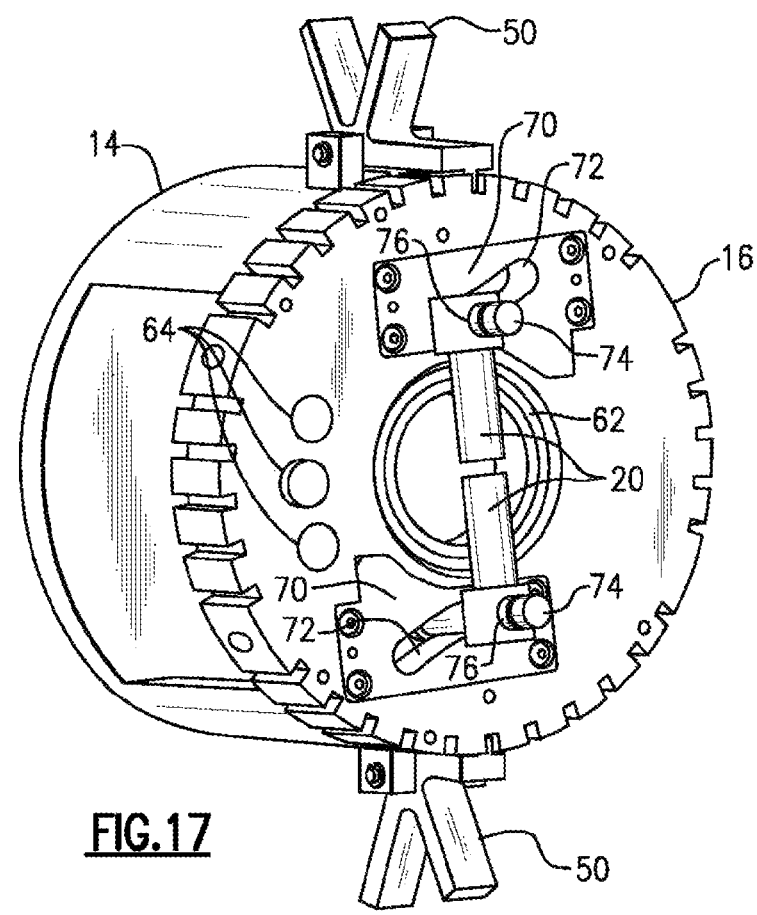
FIG. 17 is a front side elevational perspective view of an exemplary housing member, an exemplary cam disc and an exemplary coupling pins of the actuator decoupler of FIG. 1.

The cam disc 16 may also include one or more cam inserts 70 defining a cam slot 72 therethrough, as depicted in FIGS. 11, 13, 17, 21 and 22. The cam disc 26 and each cam insert 70 may be configured such that each cam insert 70 can be selectively secured to the cam disc 16. For example, the cam disc 16 and each cam insert 70 may be configured such that each cam insert 70 can be bolted, pinned or otherwise removably secured to the cam disc 16. In such an arrangement, the cam disc 16 can be customized with differing cam inserts 70 for a particular coupling pin 20, sleeve member 12, driving part 30A, actuation system in which the actuator is installed and combinations thereof, for example. In the illustrated embodiment as shown in FIGS. 11 and 17, the actuator decoupler 10 includes two coupling pins 20 (see FIGS. 3, 7 and 8) and therefore includes two removable can inserts 70. As best shown in FIG. 17, a cam pin 74 may be inserted in each cam slot 72 and through an aperture 76 of the head of each pin 20. In this way, each coupling pin 20 is coupled in the aperture 32 of the sleeve member 12 and to a cam slot 72 via a cam pin 74.

Each cam pin 74 and cam slot 72 may be configured such that a first end of the cam pin 74 is slidably and/or rotatably received within a corresponding cam slot 72. As such, the relative dimensions of each cam pin 74 and cam slot 72 may be dependent upon, or at least related to, each other. Further, each cam pin 74 and cam slot 72 can be configured such that each cam pin 74 is carried within a corresponding cam slot 74, and each cam pin 74 is capable of moving along the corresponding cam slot 74 according to the profile of the cam slot 72. As best shown in FIG. 11, each cam slot 72 defines a particular profile that extends angularly or rotationally and laterally or radially about the cam disc 16 and longitudinal axis X-X such that a first side or portion of the profile of each cam slot 72 is laterally or radial positioned proximate to the sleeve member 12 and longitudinal axis X-X and the opposing angularly or rotationally spaced second side or portion of the cam slot 72 is laterally or radially distal the sleeve member 12 and longitudinal axis X-X as compared to first side (i.e., the first side or portion is relatively laterally or radially closer to the longitudinal axis X-X as compared to the second side or portion).

Figure 20:
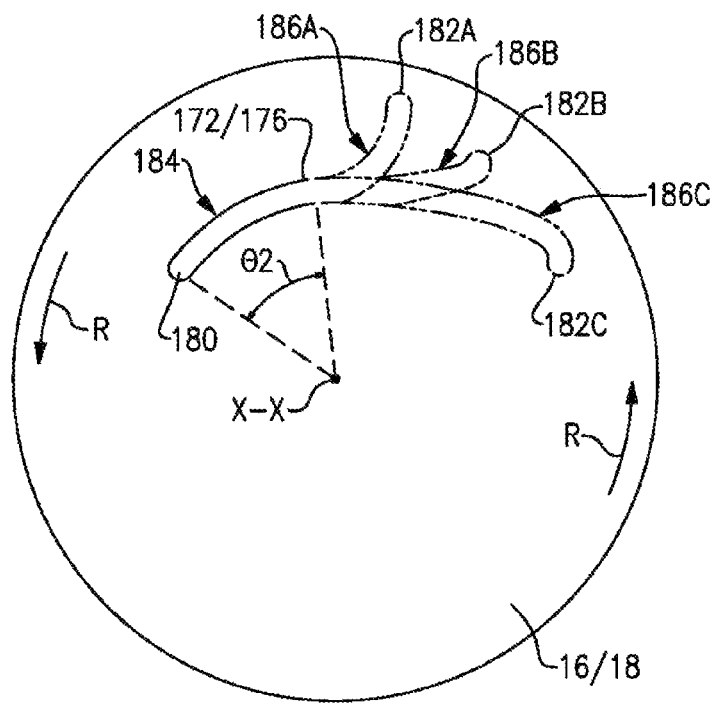
FIG. 20 is an illustration of alternative cam slot embodiments.
Figure 21:
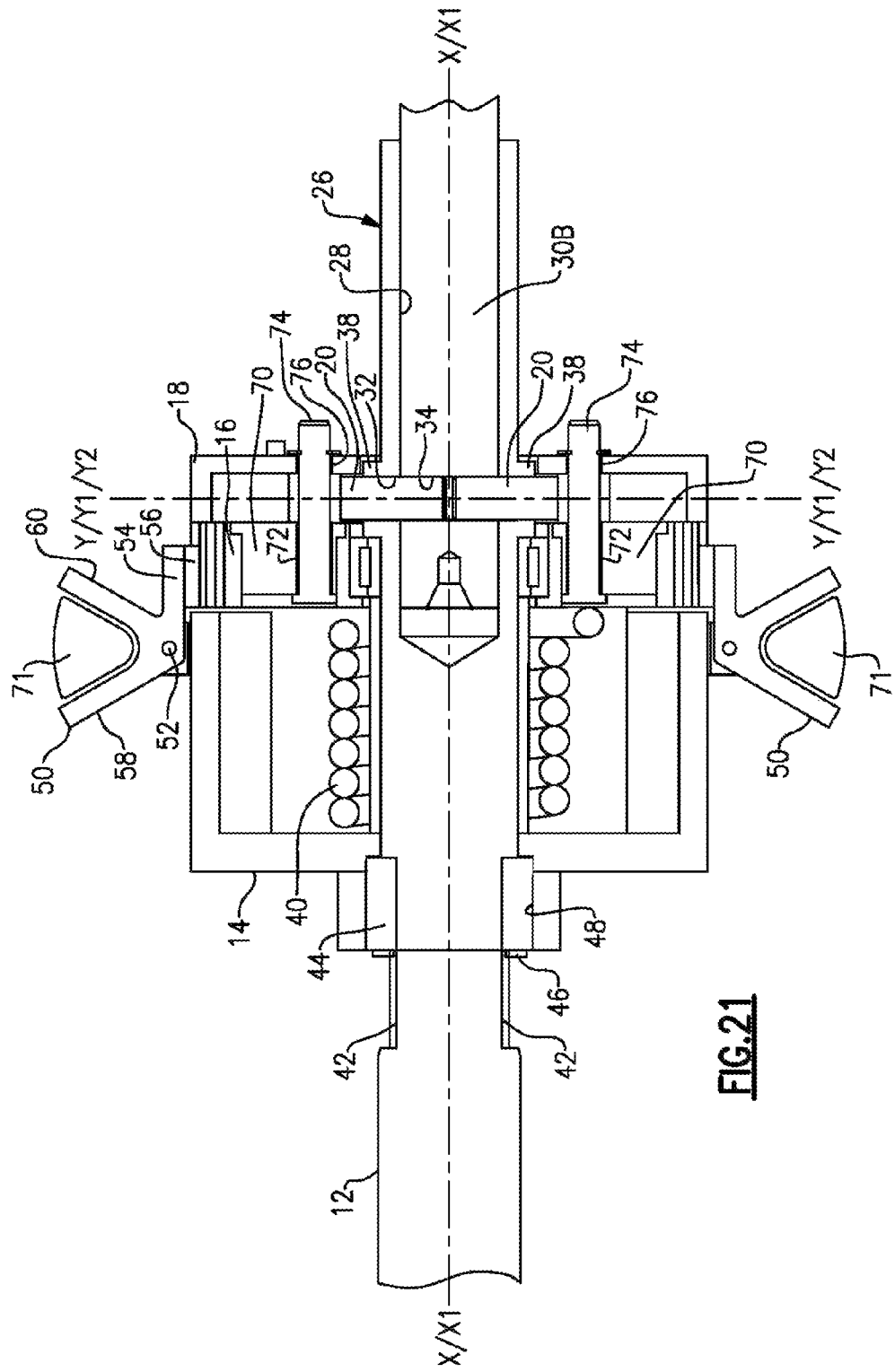
FIG. 21 is a partial front side cross-sectional view of the exemplary actuator decoupler of FIG. 1 selectively coupled to an exemplary driven part and interacting with an exemplary secondary actuator taken along a plane defined by the longitudinal and lateral axes of an exemplary sleeve member and an exemplary driven part.

In some embodiments, one end of each cam pin 74 is carried within a corresponding cam slot 72 in the cam disc 16, passes through an aperture 76 of a coupling pin 20, and the second end of each cam pin 74 is carried within a corresponding cam slot 76 in a cam disc cover 18 coupled to the cam disc 16, as shown in FIGS. 13, 20 and 21. In such embodiments, the cam disk cover 18 and cam disc 16 may be configured such that each pin 20 is positioned between the disc cover 18 and the cam disc 16, and each corresponding cam pin 74 spans from a cam slot 72 of the cam disc 16 to a corresponding cam slot 76 of the cam disc cover 18. The cam disc cover 18 may define the cam slot 72, or may include a cam slot insert as like with the illustrated cam disc 16. By supporting both end portions of each cam pin 74, the cam disc 16 and cam disc cover 18 may be particularly effective in translating each cam pin 74 without rocking, bending or otherwise unevenly or smoothly translating each cam pin 74 smoothly along corresponding cam slots 72, 76. The cam disc 16 and the cam disc cover 18 may thereby form two longitudinally spaced cam members or cam disc members including substantially aligned cam slots 72, 76, or a pair of substantially aligned cam slots 72, 76, defining a cam profile.

Figure 18:
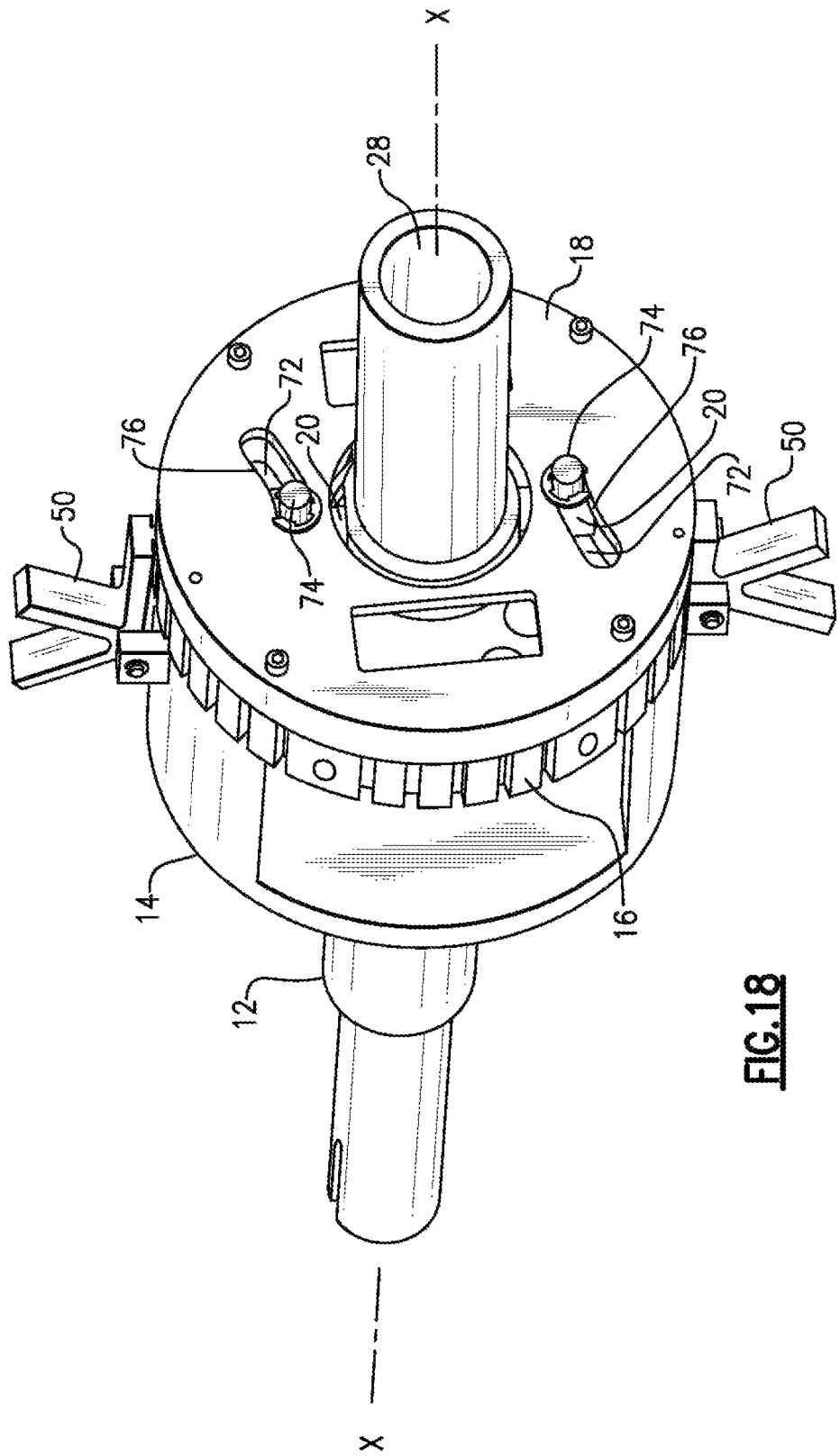
FIG. 18 is a front side elevational perspective view of the actuator decoupler of FIG. 1.

The cam disc 16 and the cam disc cover 18 may include any number of pairs of cam slots 72, 76 (and associated structure). For example, the cam disc 16 and the cam disc cover 18 may include one pair of cam slots 72, 76 (and thereby one corresponding coupling pin 20) (not shown). As another example, as shown in the illustrated embodiment in FIGS. 17 and 18, the cam disc 16 and the cam disc cover 18 may include two pair of cam slots 72, 76 diametrically opposed from one another about the longitudinal axis X-X of the sleeve 12 (and associated structure). In such an embodiment, the actuator decoupler 10 is substantially symmetrical about the longitudinal axis X-X and thereby is advantageously configured for rotation about the longitudinal axis X-X. In other embodiments (not shown), the cam disc 16 and the cam disc cover 18 of the actuator decoupler 10 may include more than two pairs of cam slots 72, 76. For example, the cam disc 16 and the cam disc cover 18 may include an even number of pairs of substantially aligned cam slots 72, 76 symmetrically disposed about the longitudinal axis X-X (and associated structure). In another embodiment (not shown), the cam disc 16 and the cam disc cover 18 of the actuator decoupler 10 may include an odd number of pairs of cam slots 72, 76 (and associated structure). In yet another alternative embodiment, only one of the cam disc 16 and the cam disc cover 18 may be provided, and thereby each pin 20 may be received in only one cam slot 72 or 76.

Figure 19:
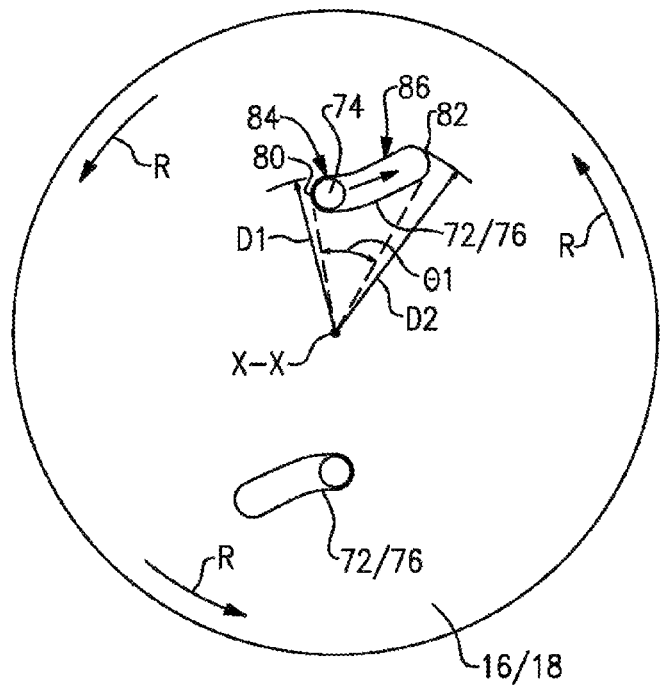
FIG. 19 is an illustration of exemplary cam slots of an exemplary cam disc and an exemplary cam disc cover of the actuator decoupler of FIG. 1.

The configuration of the exemplary cam slots 72, 76 of the illustrated cam disc 16 and the cam disc cover 18 is depicted in FIG. 19. For brevity purposes, the cam disc 16 and the cam disc cover 18 are represented by a circle, and many of the other components and aspects of the actuator decoupler 10 are not included. As shown in the illustration of FIG. 19, the cam disc 16 and cam disc cover 18 may be configured to rotate about the longitudinal axis X-X of the sleeve member 12 in a substantially counterclockwise direction of rotation R by the torque of the torsion spring 40. In such a configuration, the torsion spring 40 would have been preloaded by twisting the torsion spring 40 in a substantially clockwise direction of rotation, such as by rotating the cam disc 16 in a clockwise direction of rotation about the sleeve member 12. It is noted, however, that the cam disc 16 and cam disc cover 18 may alternatively be configured to rotate in a substantially clockwise direction of rotation R, and the torsion spring 40 thereby preloaded by twisting the torsion spring 40 in a substantially counterclockwise direction of rotation.

As can be seen from FIG. 19, the profile of the cam slots 72, 76 of the cam disc 16 and the cam disc cover 18 may be configured such that a first end 80 of the cam slots 72, 76 is laterally or radially positioned a first distance D1 from the longitudinal axis X-X (the axis of rotation of the cam disc 16 and the cam disc cover 18). Further, the cam slots 72, 76 may angularly and radially extend such that a second end 82 of the cam slots 72, 76 is radially positioned a second distance D2 from the longitudinal axis X-X and angularly spaced in a direction opposite the direction of rotation R a predefined degree of angulation or rotation θ1. As the second lateral or radial distance D2 of the second side 82 of the cam slots 72, 76 is greater than the first lateral or radial distance D1 of the first side 80 of the cam slots 72, 76, the cam pin 74 carried within the cam slots 72, 76 travels along the cam slots 72, 76, the cam pin 74 is laterally or radially translated away from the sleeve member 12 and longitudinal axis X-X. For example, as shown in FIG. 19, a cam pin 74 may be positioned adjacent the first end 80 of a pair of cam slots 72, 76 when the actuator decoupler 10 is selectively coupled to a driven part 30B of an actuation system, and the actuator decoupler 10 is activated to release the preload torque of the torsion spring 40 to rotate the cam disc 16 and the cam disc cover 18, and thereby the cam slots 72, 76, about the sleeve member 12 and longitudinal axis X-X in the counterclockwise direction of rotation R. As the cam slots 72, 76 are rotated about the sleeve member 12 and longitudinal axis X-X, each cam pin 74 is kept from rotating about the longitudinal axis X-X by the interaction of the coupling pin with at least the lateral coupling pin aperture 32 of the sleeve member 12. Thereby, as the cam slots 72, 76 rotate in the direction of rotation R, the cam pin 74 is carried along the cam slots 72, 76 in a direction from the first end 80 to the second end 82, as indicated by the arrow in FIG. 19. Since, as described above, the second end 82 of the cam slots 72, 76 is positioned laterally or radially further from the longitudinal axis X-X than the first end 80, each cam pin 74, and the coupling pin 20 coupled thereto, is translated laterally or radially away from the sleeve member 12 and the longitudinal axis X-X. The size of the cam slots 72, 76, the size of the cam pin 74, the first and second lateral or radial distances D1, D2 of the cam slots 72, 76, and the angular degree to which the cam disc 16 and the cam disc cover 18 rotate all effect the total lateral or radial distance each cam pin 74, and therefore the coupling pins 20 coupled thereto, translate.

As shown in FIG. 19, the profile of the cam slots 72, 76 may be configured such that a passive portion 84 of the cam slots 72, 76 adjacent the first end 80 includes a lesser degree of lateral or radial slope, incline or translation rate as compared to that of an aggressive portion 86 of the cam slots 72, 76 adjacent the second end 82. In such an arrangement, the cam slots 72, 76 will likely experience a smaller degree of forces resulting from the interaction of the surfaces of the cam pin 74 that tend to resist movement of the slots 72, 76 about the cam pin 74 in the passive portion 84 of the cam slots 72, 76 as opposed to the aggressive portion 86. The less resistive or destructive nature of the passive portion 84 of the cam slots 72, 76 may therefore be advantageous to initiate rotational movement of the cam disc 16 and the cam disc cover 18, and thereby lateral or radial translation of the cam pin 74 and the coupling pin 20 coupled thereto, via the torque applied by the torsion spring 40. Once the cam disc 16 and the cam disc cover 18 have gained kinetic energy and/or momentum, movement of the aggressive portion 86 of the cam slots 72, 76 about the cam pin 74 can be accomplished with use of the combination of at least the torque applied by the torsion spring 40 and the kinetic energy and/or momentum of the cam disc 16 and the cam disc cover 18. In this way, the arrangement of the passive portion 84 and the aggressive portion 86 of the cam slots 72, 76 may require less torque force as compared to other arrangements or configurations of the cam slots 72, 76 to laterally translate the cam pins 74, and therefore the coupling pins 20 coupled thereto.

Exemplary alternative embodiments of the cam slots 72, 76 of the cam disc 16 and the cam disc cover 18 are shown in FIG. 20 and generally indicated by reference numerals 172 and 176, respectively. The cam slots 172, 176 are similar to cam slots 72, 76 described above with reference to FIG. 19, and therefore like reference numerals preceded by the numeral "1" are used to indicate like elements. Exemplary cam slots 172, 176 include a first end 180 and a passive portion 184 adjacent the first end 180. The first end 180 and passive portion 184 define the portions of the cam slots 172, 176 that are positioned laterally or radially closest to the sleeve member 12 and longitudinal axis X-X. As a result, the cam pin 74 of the actuator decoupler 10 may initially be positioned at the first end 180 within the passive portion 184 in the selectively coupled state of the actuator decoupler 10.

The exemplary passive portion 184 of the cam slots 172, 176 is configured such that the lateral or radial distance between the passive portion 184 and the sleeve member 12 and longitudinal axis X-X is constant over the degree of angulation or rotation θ2 of the passive portion 184 (i.e., constant over the entire angle formed between the side edges of the passive portion 184). Stated differently, the passive portion 184 is configured as an arcuate shape of a single radius formed about the longitudinal axis X-X. As the passive portion 184 does not include a lateral or radial slope or translation, the cam disc 16 and the cam disc cover 18 will encounter a relatively small amount of forces by the cam pin 74 acting in a manner that opposes rotation of the cam disc 16 and the cam disc cover 18 about the sleeve member 12 and longitudinal axis X-X in the direction of rotation R. Thereby, the torque applied to the cam disc 16 and the cam disc cover 18 by the torsion spring 40 in the decoupled state of the actuator to rotate the cam disc 16 and the cam disc cover 18 about the longitudinal axis X-X while the cam pin 74 travels within the passive portion 184 over the degree of angulation or rotation θ2 of the passive portion 184 may be relatively small. However, because the passive portion 184 produces a relatively small level of resistance to the cam slots 172, 176 via the cam pin 74, the cam disc 16 and the cam disc cover 18 may quickly and easily rotate about the sleeve member 12 and longitudinal axis X-X in the direction of rotation R a degree of rotation equal to the degree of angulation or rotation θ2 of the passive portion 184 such that the cam pin 74 passes through the passive portion 184 and to an adjacent aggressive portion 186A-C.

As the cam disc 16 and the cam disc cover 18 rotate about the sleeve member 12 and longitudinal axis X-X in the direction of rotation R such that the passive portion 118 of the cam slots 172, 176 is translated over the cam pin 74, the cam disc 16 and the cam disc cover 18 gain kinetic energy and/or momentum. Once the cam disc 16 and the cam disc cover 18 rotate through the angulation θ2 of the passive portion 184, further rotation of the cam disc 16 and the cam disc cover 18 abuts an aggressive portion 186A-C against the cam pin 75 because the aggressive portion 186A-C includes a lateral or radial slope or dimension, as shown in FIG. 19. FIG. 19 shows three differencing aggressive portions 186A-C—a first aggressive portion 186A, a second aggressive portion 186B and a third aggressive portion 186C. Only one of the first, second and third aggressive portions 186A-C can be used at a time to pair with a passive portion 184 to form a cam slot 172, 176. Stated differently, FIG. 19 illustrates a first aggressive portion 186A, a second aggressive portion 186B and a third aggressive portion 186C that are not meant to be used in combination, as depicted, but rather only one of the aggressive portions 186A-C used per cam slot 172, 176.

As the cam disc 16 and the cam disc cover 18 rotate through the passive portion 184, they thereby include gain kinetic energy and/or momentum when the cam slots 172, 176 first laterally or radial interact with the cam pin 17 in the aggressive portion 186A-C. In such a configuration, the aggressive portion 186A-C of the cam slots 172, 176 applies a shock or impact force to the cam pins 74 (i.e., a sudden lateral or radial acceleration caused by the impact of the aggressive portion 186A-C on the cam pins 74). The application of a shock or impact force on the cam pins 74 may be advantageous because such a force or acceleration typically has a greater effect than a lower force applied over a proportionally longer period of time due to the force being applied to the cam pin 74 before the cam pin 74 is able to disperse such forces. In this way, the cam slots 172, 176 may be configured such that the passive portion 184 is configured to allow the cam slots 172, 176 to achieve a velocity/acceleration, and the aggressive portion 186A-C of the cam slots 172, 176 is configured to apply a shock or impact force to the cam pin 74 in a lateral or radial direction to overcome the resistive forces applied to the cam pin 74, such as static friction, to laterally or radially translate each cam pin 74 and each coupling pin 20 coupled thereto.

The particular configuration of the aggressive portion 186A-C may depend upon the particular actuation system in which the actuator decoupler 10 is installed and the particular configuration of the actuator decoupler 10. For example, the configuration of the aggressive portion 186A-C of the cam slots 172, 176 may depend, or at least be related to, the amount of each coupling pin 20 engaged within a lateral coupling pin aperture 34 of the driven part 30B, the amount of torque applied by the torsion spring 40, the amount of kinetic energy and momentum the cam disc 16 and the cam disc cover 18 achieve during the passive portion 118, and the amount of lateral or radial shock or impact force needed to overcome the resistance forces of a particular cam pin 74 to laterally or radially translate the cam pin 74 and the coupling pin 20 coupled thereto.

FIG. 20 illustrates three exemplary aggressive portions 186A-C of the cam slots 172, 176. A first aggressive portion 186A includes a relatively steep lateral or radial slope, a relatively large lateral or radial translation or extension, and extends for relatively short angular distance. As shown in FIG. 20, the lateral or radial slope of the first aggressive portion 186A increases as the first aggressive portion 186A angularly extends from the passive portion 184 to the second end 186A. The first aggressive portion 186A may thereby require a relatively large rotational torque of the torsion spring 40, a relatively large shock or impact force or a combination thereof for the first aggressive portion 186A to laterally or radially translate the cam pin 74 to the second end 182A. However, the first aggressive portion 186A requires a relatively small amount or degree of angular rotation of the cam slots 172, 176, and therefore the cam disc 16 and the cam disc cover 18. Further, the relatively large lateral or radial translation or extension of the first aggressive portion 186A allows the coupling pins 20 to be positioned relatively deep in the coupling pin aperture 34 of the driven portion 30B.

As can be seen from FIG. 20, in contrast to the exemplary first aggressive portion 186A, the exemplary second aggressive portion 186B includes a relatively shallow lateral or radial slope, a relatively short lateral or radial translation or extension, and extends for relatively large angular distance. The second aggressive portion 186B may thereby require a relatively small rotational torque of the torsion spring 40, a relatively small shock or impact force or a combination thereof for the second aggressive portion 186B to laterally or radially translate the cam pin 74 to the second end 182B. However, the second aggressive portion 186B requires a relatively large amount or degree of angular rotation of the cam slots 172, 176 and therefore the cam disc 16 and the cam disc cover 18.

As can also be seen from FIG. 20, in contrast to the exemplary first aggressive portion 186A and the exemplary second aggressive portion 186B, the exemplary third aggressive portion 186C includes a relatively shallow lateral or radial slope, a relatively short lateral or radial translation or extension, and extends for relatively large angular distance. The third aggressive portion 186C may thereby require a relatively small rotational torque of the torsion spring 40, a relatively small shock or impact force or a combination thereof for the second aggressive portion 186B to laterally or radially translate the cam pin 74 to the second end 182B. However, the second aggressive portion 186B requires a relatively large amount or degree of angular rotation of the cam slots 172, 176 and therefore the cam disc 16 and the cam disc cover 18.

The third aggressive portion 186C is further configured such that the furthest lateral or radial translation or extension of the third aggressive portion 186C is positioned adjacent to the second end 182C of the third aggressive portion 186C, as shown in FIG. 20. Stated differently, the lateral or radial position of the second end 182C of the third aggressive portion 186C is laterally or radially positioned closer to the longitudinal axis X-X than the portion of the third aggressive portion 186C adjacent the second end 182C. In such a configuration, as can be seen from FIG. 20, the third aggressive portion 186C force the cam pin 74 and the coupling pin 20 coupled thereto to initially laterally or radially translate away from the longitudinal axis X-X as the cam disc 16 and the cam disc cover 18 are rotated in the direction of rotation R, and then laterally or radially translate partially back toward the longitudinal axis X-X until the cam pin 74 abuts the second end 182C of the cam slots 172, 176 such that the maximum amount or degree of angulation of the cam disc 16 and cam disc cover 18 is exhausted.

Figures 22, 23:
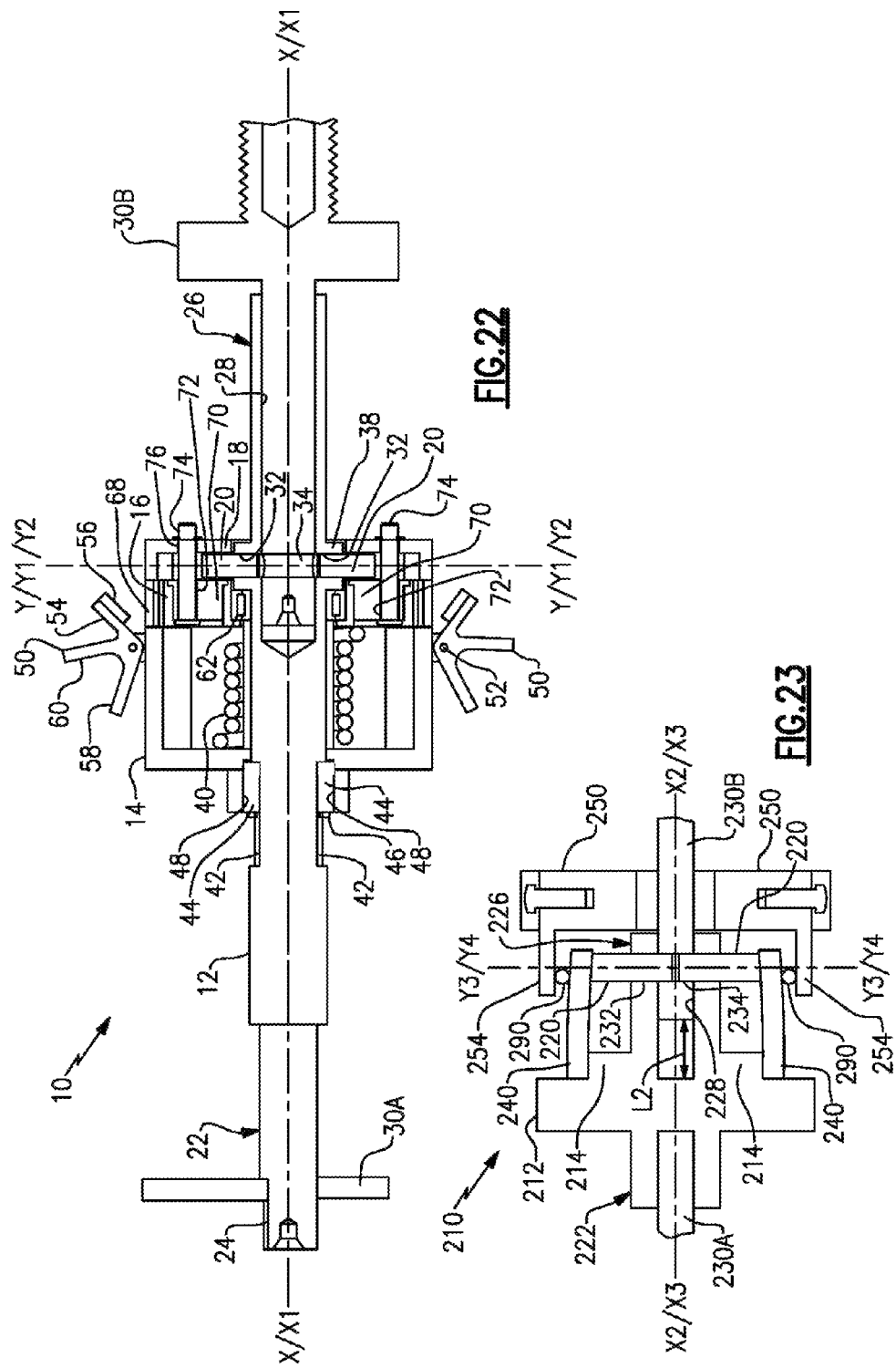
FIG. 22 is a front side cross-sectional view of the exemplary actuator decoupler of FIG. 1 selectively decoupled from an exemplary driven part taken along a plane defined by the longitudinal and lateral axes of an exemplary sleeve member and the driven part.
FIG. 23 is a partial front side cross-sectional view of a second exemplary embodiment of an actuator decoupler of the present disclosure coupled to an exemplary driving part and selectively coupled to an exemplary driven part.

The actuator decoupler 10 of FIGS. 1-3, and the components of the actuator decoupler 10 illustrated in FIGS. 4-18, is shown in use in the cross-sectional views of FIGS. 21 and 22. Specifically, FIG. 21 illustrates the actuator decoupler 10 in the coupled state wherein the actuator decoupler 10 couples the driving part 30A and driven part 30B (and therefore the load recipient as discussed above), such that the driving part 30A and driven part 30B are rotationally and longitudinally fixed to one another via the coupling pins 20, and FIG. 22 illustrates the actuator decoupler 10 in the decoupled state wherein the actuator decoupler 10 has decoupled the driving part 30A and the driven part 30B (and therefore the load recipient as discussed above) such that the driven part 30B is capable of rotationally and longitudinally translating independent of the driving part 30A and the actuator decoupler 10.

As shown in the cross-sectional view of FIG. 21, when the actuator decoupler 10 is installed in an actuation system and configured in a selectively coupled state, the driving part 30A of the sleeve member 12 can be coupled to a driving part 30A (not shown), the driven part 30B can be positioned within the longitudinally extending aperture 28 of the driven portion 26 of the sleeve member 12, and each coupling pin 20 can be engaged with the lateral coupling pin aperture 34 of the driven part 30B and the lateral coupling pin aperture 32 of the sleeve member 12. The driven part 30B and sleeve member 12 may be configured such that the longitudinal axes X-X, X1-X1 of the sleeve member 12 and driven part 30B are substantially aligned. As each coupling pin 20 is laterally translatable via the cam slots 72, 76 of the cam disc 16 and the cam disc cover 178, each coupling pin 20 thereby may selectively rotationally and longitudinally lock or fix the driven part 30B (and therefore the load recipient coupled thereto) to the actuator decoupler 10 and the driving part 30A (assuming the driving part 30A is rotationally and longitudinally locked or fixed to the sleeve member).

Each coupling pin 20 may be positioned between the cam disc 16 and a cam disc cover 16 (i.e., longitudinally spaced cam members or cam disc members) and coupled to a corresponding cam pin 74. Each end of each cam pin 74 can be carried within a corresponding pair of cam slots 72, 76 of the cam disc 16 and a cam disc cover 18. The cam disc 16 and cam disc cover 18 can be rotatably coupled to the sleeve member 12 via a bearing mechanism. Each cam slot 72, 76 of the pairs of cam slots 72, 76 of the cam disc 16 and the cam disc cover 18 may be substantially the same profile and they may be substantially aligned. The profile of each cam slot 72, 76 of the pairs of cam slots 72, 76 may be configured such that each cam slot 72, 76 extends laterally away from the longitudinal axes X-X, X1-X1 of the sleeve member 12 and driven part 30B as each slot 72, 76 extends angularly or rotationally in a first direction. In the coupled state of the actuator decoupler 110 and the driven part 30B, each cam pin 74 is positioned in the portion of the corresponding pair of cam slots 72, 76 that is laterally closest to the longitudinal axes X-X, X1-X1, thereby laterally positioning each coupling pin 20 within the lateral coupling pin aperture 34 of the driven part 30B.

The rotational position of the cam slots 72, 76 with respect to the cam pins 74 (and therefore the lateral position of the coupling pins 20 in the sleeve member 12 and driven part 30) can be locked or maintained via the locking members 50, to retain the torque biasing the cam disc 16 and the cam disc cover 18 in the first direction. Specifically, the locking members 50 may be coupled to the housing member 14, which is rotationally and longitudinally locked to the sleeve member 12. In such a configuration, a protrusion of a first arm of the locking member 50 may selectively engaged with a slot 68 of the can disc 16. In this way, the locking member 50 prevents the biasing torque of the energy mechanism 40 from rotating the cam disc 16 and the cam disc cover 18 by locking the angular or rotational position of the cam slots 72, 76, and therefore the lateral positioning of the coupling pins 20.

The locking member 50 may also include a second arm 58 and a third arm 60 configured such that a secondary actuator 71 can be positioned between the second 58 and third arm 60, as shown in FIG. 21. The second arm 58 may be engaged and translated by the secondary actuator 71 to release the preload of the energy mechanism 40 and decouple the driven part 30B from the actuator decoupler 10 and the driving part 30A, as explained above and further below. The configuration of the third arm 60 and the secondary actuator 71 may retain the locking member 50 in the coupled state with the cam disc 16 by preventing first arm 54 from translating in a longitudinal direction such that the protrusion 56 of the first arm 54 disengages from the slot 68 of the cam disc 16. Thereby, the configuration of the locking member 50 and the secondary actuator 71 prevents accidental or erroneous uncoupling of the cam disc 16 such that the cam disc 16 is able to rotate due to the torque provided by the energy mechanism 40. In this manner, the actuator decoupler 10 can utilize a secondary actuator 71 to monitor for a jam in the actuation system in which the actuator decoupler 10 is installed, and only release the preload energy of the energy mechanism 40 when a jam is detected.

In contrast to the coupled state of the actuator decoupler 10, FIG. 22 shows the actuator decoupler 10 in a decoupled state. The decoupled state may have been responsive to a jam in the actuation system in which the actuator decoupler 10 is installed. For example, if the driven part 30B is a component of a power screw that controls, ultimately, a load recipient, a secondary actuator 71 may be configured to detect a jam in the power screw and interact with the second arm 58 of the locking member 50 (see FIGS. 15 and 21) to rotate the locking member 50 about the pivot point 52 to disengage the protrusion 56 of the first arm 54 from a slot 68 of the cam disc 18, as shown in FIG. 22. In such an embodiment, the preload torque of the torsion spring 40 is no longer prevented from acting on the cam disc 16.

As such, as shown in FIG. 22, the torsion spring 40 can act on the cam disc 16 and thereby rotate the cam disc 16 and cam disc cover 18 about the sleeve member 12 and, as a result, rotate the cam slot 72 of the cam disc 16 and the corresponding cam slot 76 of the cam disc cover 18 about the longitudinal axis X-X. As also shown in FIG. 22, rotation of the pairs of cam slots 72, 76 will force the cam pins 74 from a first angular side or portion of the cam slots 72, 76 that is positioned laterally closer to the sleeve member 12 and the longitudinal axis X-X to a second angular side or portion of the cam slots 72, 76 that is positioned laterally further from the sleeve member 12 and the longitudinal axis X-X. As the coupling pins 20 are held within at least the lateral coupling pin aperture 32 of the sleeve member 12, the coupling pins 20 are prevented from rotation about the sleeve member 12 and the longitudinal axis X-X, but are substantially free to translate laterally or radially within the lateral pin aperture 32 except for friction between the exterior of the coupling pins 20 and the interior surfaces of the aperture 32 and the interior surfaces of the lateral coupling pin aperture 34 of the driven part 30B when the coupling pins 20 are positioned with the pin aperture 34 of the driven part 30B, as shown in FIGS. 7 and 8. Thereby, each coupling pin 20 prevents the corresponding cam pin 74 coupled thereto from rotation about the sleeve member 12 and the longitudinal axis X-X. The resulting effect is that as the cam slots 72, 76 of the cam disc 16 and cam disc cover 18, respectively, rotate about the sleeve member 12 and the longitudinal axis X-X, the cam pins 74 resist any forces tending to translate the cam pins 74 about the sleeve member 12 and longitudinal axis X-X and force the cam slots 72, 76 to translate about the cam pins 74, as shown in FIG. 22.

As described above, as the cam slots 72, 76 include a profile that increases in lateral distance in the angular direction of the rotation of the cam disc 16 and cam disc cover 18 via the torsion spring 40, the cam pins 74 are forced, carried or "ride" the cam slots 72, 76 in the lateral direction defined by the axis Y-Y of the coupling pin aperture 32 of the sleeve member 12 and/or the axis Y1-Y1 of the coupling pin aperture 34 of the driven part 30B only in the lateral direction. Stated differently, as the cam slots 72, 76 rotate about the sleeve member 12 and longitudinal axis X-X, the cam pins 74 only laterally translate in a direction dictated by the lateral coupling pin aperture 32 of the sleeve member 12 and/or the lateral coupling pin aperture 34 of the driven part 30B. In this way, the cam pins 74 pull the coupling pins 20 in the lateral direction along the lateral axis Y2-Y2 of the coupling pin 20 to translate the coupling pin 20 along the lateral axes Y-Y, Y1-Y1 of the lateral coupling pin apertures 32, 34 of the sleeve member 12 and the driven part 30B to a predefined degree such that the coupling pin 20 are translated out of engagement within the lateral coupling pin aperture 34 of the driving part 30A, as shown in the comparison between the position of the coupling pins 20 in FIGS. 7 and 21 to FIGS. 8 and 22.

As noted above the, the coupling pin 20 are likely to experience loads or forces that increase the friction between the outer surfaces of the coupling pin 20 and the inner surfaces of the lateral coupling pin apertures 32, 34 of the sleeve member 12 and the driven part 30B. Further, as also described above, the cam pins 74 are subjected to frictional resistance while they travel within the cam slots 72, 76, and the cam disc 16 encounters resistance as is rotated about the sleeve member 12. These force, and any other forces on the components of the actuator decoupler 10 during decoupling of the driven part 30B, act to provide resistance to the lateral translation of the coupling pins 20 from within the lateral coupling pin aperture 34 of the driven part 30B by the actuator decoupler 10. The amount of preload torque of the torsion spring 40 must therefore be sufficient to overcome such resistance to decouple the actuator decoupler 10, and thereby the driving part 30A, from the driven part 30B. Sufficient torque may be achieved, for example, through the characteristics of the torsion spring itself, the amount of preload applied to the torsion spring, the profile of the cam slots 72, 76 or a combination thereof.

Once the coupling pin 20 are translated out of engagement within the lateral coupling pin aperture 34 of the driven part 30B, as shown in FIGS. 8 and 22, the driven part 30B is free to translate both rotationally and longitudinally with respect to the actuator decoupler 10. Further, if the actuator decoupler 10 is rotationally and longitudinally fixed to the driving part 30A, the once the coupling pins 20 are translated out of engagement within the lateral coupling pin aperture 34 of the driven part 30B, the driven part 30B is free to translate both rotationally and longitudinally with respect to the driving part 30A. Such longitudinal, and potentially rotational, translation may be particularly advantageous for an actuation system in which the driven part 30B is a component of a power screw, such as actuation system in which the driven part 30B is a component of a power screw that provides longitudinal forces, ultimately, to a load control surface, such as flight control surface. More specifically, in such a configuration, if the flight control surface includes multiple actuation systems supplying a cumulative load to translate the flight control surface, and an actuation system in which the actuator decouple 10 is installed experiences a jam in the power screw for example, the flight control surface is prevented from moving (i.e., the flight control surface is "frozen" by the jammed actuation system). In response to such a jam, the actuator decoupler 10 can disengage the driven part 30B from the actuator decoupler 10 and the driving part 30A to allow the power screw to freely rotate or longitudinally translate. Such free rotation and/or longitudinally translation of the power screw, provided by the actuator decouple 10, acts to remove the jam from the flight control surface and allows the other non-jammed actuation systems to translate the flight control surface, and thereby longitudinally and/or rotationally translate the power screw with respect to the actuator decoupler 10 and the driving part 30A.

FIG. 23 shows an exemplary alternative embodiment of the actuator decoupler generally indicated by reference numeral 210. Exemplary actuator decoupler 210 is similar to the exemplary actuator decoupler 10 described above and illustrated in FIGS. 1-19 and 20-22, and therefore like reference numerals preceded by the numeral "2" are used to indicate like elements. The exemplary actuator decoupler 210 includes a sleeve member 212, an energy mechanism 240, coupling pins 220 and locking members 250.

As shown in FIG. 23, the exemplary actuator decoupler 210 includes a sleeve member 212 defining a longitudinal axis X2-X2 and configured to couple to a driving part 230A at a driving portion 222 such that the driving part 30A applies a torque to the sleeve member 212 to rotate the sleeve member 212 about the longitudinal axis X2-X2. The driving part 230A may be coupled to the sleeve member 212 such that the sleeve member 212 and the actuator decoupler 210 are rotationally and longitudinally fixed to the driven part 30B.

The sleeve member 212 may also configured to include a driven portion 226 configured to transfer a torque and/or longitudinal or axial force of the driving part 230A to a driven part or mechanism 230B. In embodiments wherein the driven part 230B is configured to rotate upon receipt of the torque of the driving part 230A, such as when the driven part 230 is a component of a power screw, the driven part 230B may define a longitudinal axis of rotation X3-X3 that substantially aligns with the longitudinal axis X2-X2 of the sleeve member 212.

As also shown in FIG. 23, the exemplar sleeve member 212 includes a longitudinally extending aperture 228 extending from an end of the sleeve member 212 at the driven portion 228 of the sleeve member 212. The sleeve member 212 also includes a laterally extending coupling pin aperture 232 defining a lateral or radial axis Y3-Y3 extending entirely though the sleeve member 212 and the longitudinal or axial axis X2-X2 such that the pin aperture 232 forms two diametrically opposed openings in the outer surface of the sleeve member 212. The driven part 230B may also include a laterally extending coupling pin aperture 234 defining a lateral or radial axis Y4-Y4 extending entirely though the driven part 230 and the longitudinal or axial axis of rotation X3-X3 such that the pin aperture 234 forms two diametrically opposed openings in the outer surface of the driven part 230B. In such a configuration, the driven part 230B may be received within the longitudinally extending of aperture 228 of the driven portion 226 of the sleeve member 212 such that the openings of the pin aperture 232 of the sleeve member 212 are aligned with the openings of the pin aperture 234 of the driven part 230B (i.e., the apertures 232, 234 are aligned). The coupling pin aperture or apertures 234 may be alternatively configured in any known manner without departing from the spirit and scope of the disclosure.

In such a configuration of the sleeve member 212 and the driven part 230B, the coupling pins 220 may be translated into engagement with the pin aperture 232 of the sleeve member 212 and the pin aperture 234 of the driven part 230B such that the driven part 230B is rotationally and longitudinally fixed or locked with respect to the sleeve member 212 (and therefore the actuator decoupler 210) and the driving part 230A if the driving part 230A is rotationally and longitudinally fixed or locked with respect to the sleeve member 212, as shown in FIG. 23. The lateral coupling pin apertures 232, 234 of the sleeve member 212 and driven part 230B may be configured such that a longitudinally extending gap of length L2 extends between the end of the longitudinally extending aperture 228 of the driven portion 226 of the sleeve member 212 and the end of the driven part 230B, as shown in FIG. 23. As explained further below, such a longitudinally extending gap will allow the driven part 230B to longitudinally translate with respect to the actuator decoupler 210 in a selectively decoupled state. As also shown in FIG. 23, each coupling pin 220 may be coupled to an energy mechanism 240 that is coupled to, and extends from, the housing member 214 of the sleeve member 212.

In the illustrated embodiments of FIG. 23, the energy mechanism 240 is a cantilever member 240 extending from a housing member portion 214 of the sleeve member 212, and includes a coupling pin 220 extending from a portion of the cantilever member 240 adjacent the free end thereof. The cantilever member 240 may be configured such that in a free position, the coupling pin 220 is spaced from the opening of the pin aperture 234 of the driven part 230B. The cantilever member 240 may also be configured such that when the cantilever member 240 is deformed in a manner that the free end is translated toward the longitudinal axis X2-X2, the coupling pin 220 is aligned and translated to a position at least partially within the lateral pin aperture 232 of the sleeve member 212 and the lateral pin aperture 234 of the driven part 230B to selectively couple the actuator decoupler 210 and the driven part 230B such that they are rotationally and longitudinally locked or fixed with respect to one another, as depicted in FIG. 23. Further, in such a selectively coupled state, if the driving part 230A is rotationally and longitudinally locked or fixed with respect to the actuator decoupler 210, the driven part 230B will also be rotationally and longitudinally locked or fixed with respect to driving part 230A.

When in the coupled state, the deformation of the cantilever member 240 such that the coupling pin 220 coupled thereto is laterally translated into engagement within the lateral pin apertures 232, 234 of the sleeve member 212 and driven part 230B creates a preload force in the cantilever member 240. The preload force in the cantilever member 240 is directed in a direction substantially opposing the direction of the deformation of the cantilever member 240. In this way, in the selectively coupled state of the actuator decoupler 210 each cantilever member 240 includes a preload force that biases the coupling pin 220 coupled thereto in a direction that laterally translates the coupling pin 220 out of engagement within the lateral pin apertures 232, 234 of the sleeve member 212 and the driven part 230B.

To selectively retain and release the preload force of each cantilever member 240, and thereby the positioning of each coupling pin 220 within the pin aperture 234 of the driven part 230B, the exemplary actuator decoupler 210 includes a locking member 250 corresponding to each cantilever member 240, as illustrated in FIG. 23. The locking member 250 may be translatably or movably coupled to the sleeve member 212 and/or the driven part 230B. For example, in the illustrated embodiment, each locking member 250 is longitudinally movably coupled to the driven part 230B along the longitudinal axis X3-X3 of the driven part 230.

Each locking member 250 may include a first arm 254 extending from the locking member 250 configured to engage a bearing member 290 positioned on the cantilever member 240, to thereby engage the cantilever member 240. The first arm 254 of the locking member 250 and the bearing member 290 can be configured such that the deformed lateral position of the cantilever member 240, and therefore the lateral position of the coupling pin 220 coupled thereto, is maintained by the bearing member 290 and the first arm 254, as shown in FIG. 23. Specifically, in the illustrated embodiment the preload of the cantilever member 240 is translated through the bearing member 290 and to the first arm 254 which is configured to resist such load. As such, each locking member 250 is configured to selectively retain the preloaded energy of each cantilever member 240 and maintain engagement of the coupling pin 220 coupled thereto within the pin aperture 232 of the sleeve member 212 and the pin aperture 234 of the driven part 230B in a selectively coupled state of the actuator decoupler 210. In the illustrated embodiment, as each locking member 250 is configured to longitudinally translate, the bearing member 290 is preferably configured to reduce or substantially eliminate the friction or other resistance between the cantilever member 240 and the first arm 254 when the first arm 254 is laterally translated with respect to the cantilever member 240.

To selectively decouple the driven part 230B from the actuator decoupler 210 and, potentially, the driving part 230A, the actuator decoupler 210 can be actuated by a secondary actuator (not shown) to release the preload of each cantilever member 240 and laterally translate each coupling pin 220 out of engagement within at least the pin aperture 234 of the driven part 230B. Specifically, the secondary actuator can be responsive to a jam in the actuation system in which the actuator decoupler 210 is installed to longitudinally translate each locking member 250, and thereby the first arm 254 of each locking member 250, a longitudinal distance such that each first arm 254 is disengaged from each cantilever member 240.

When each first arm 254 is disengaged from each cantilever member 240, each cantilever member 240 is free to release its preload and thereby return to its pre-deformed orientation. As described above, in the free or non-deflected position of each cantilever member 240 the coupling pin 220 coupled thereto is spaced from the pin aperture 234 of the driven part 230B. As such, each locking member 250 is configured to translate to an unlocking position to selectively release the preloaded energy of each cantilever member 240 to disengage the coupling pin 220 coupled thereto from within the aperture 234 of the driven part 230B (and potentially the pin aperture 232 of the sleeve member 212) such that the driven part 230B is free to translate both rotationally and longitudinally with respect to the sleeve member 212 (and therefore the actuator decoupler 210) and the driving part 230A. In the illustrated embodiment, in the decoupled state the driven part 230B is capable of longitudinally translating away from the actuator decoupler 210 by translating within the longitudinally extending aperture 228 of the driven portion 226 of the sleeve member 212, longitudinally translating toward the actuator decoupler 210 by translating within the longitudinally extending aperture 228 of the driven portion 226 of the sleeve member 212 a distance L2 (the longitudinal distance of the gap between the end of the driven part 230 and the end of the longitudinally extending aperture 228), and rotating about the axis X3-X3 within the longitudinally extending aperture 228.

It is noted that that the actuator decoupler 210 may include multiple coupling pins 220, multiple lateral pin apertures 232 in the sleeve member 212 and in the driven part 230B, multiple energy mechanisms, and multiple locking mechanisms 250 about the longitudinal axis X2-X2. In such a configuration, the load or forces applied to the coupling pins 220 via the driving part 230A and/or the driven part 230B through the sleeve member 212 will be proportionally shared by the coupling pins 220. Thereby, the more couplings pins 220 (and associated components) included in the actuator decoupler 210, the less the load or forces applied to each coupling pin 220. However, the more couplings pins 220 (and associated components) included in the actuator decoupler 210, the actuator decoupler 210 becomes less reliable as opportunities for failure is increased also increased.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An actuator decoupler for selectively coupling and decoupling a driven part with a driving part of an actuation system, the actuator decoupler comprising:
    a sleeve member defining a longitudinal axis and including a first portion configured to couple to the driving part, and a second portion configured to couple to the driven part to receive at least one of a torque about the longitudinal axis and a force along the longitudinal axis from the driving part;
    a housing member rotationally and longitudinally fixed to the sleeve member;
    at least one coupling pin selectively engaged with the second portion of the sleeve member and the driven part when the driven part is coupled to the sleeve member such that the sleeve member and the driven part are at least one of rotationally and longitudinally fixed to one another by the at least one coupling pin;
    at least one preloaded energy mechanism coupled to the housing member and the at least one coupling pin; and
    at least one engageable locking member movably coupled to the at least one preloaded energy mechanism and, in a locking position, selectively retaining a preloaded energy of the at least one preloaded energy mechanism and maintaining the engagement of the at least one coupling pin with the sleeve member and the driven part, and, in an unlocking position, selectively releasing the preloaded energy of the at least one preloaded energy mechanism and thereby disengaging the at least one coupling pin from at least the driven part such that the driven part is free to translate at least one of rotationally and longitudinally with respect to the sleeve member and the driving part.

2. The actuator decoupler of claim 1, wherein the at least one preloaded energy mechanism is a preloaded resilient member coupled to a cam disc that is rotatably coupled about the sleeve member.

3. The actuator decoupler of claim 2, wherein the preloaded resilient member is a preloaded torsion spring, and wherein the preloaded energy of the torsion spring is a torque applied to the cam disc that biases the cam disc in a first rotational direction.

4. The actuator decoupler of claim 3, wherein when each coupling pin is selectively engaged with the sleeve member and the driven part, each coupling pin is received within an aperture of the sleeve member and an aperture of the driven part.

5. The actuator decoupler of claim 4, wherein the cam disc includes two longitudinally spaced cam disc members, and wherein the cam disc members include at least one pair of substantially aligned cam slots corresponding to each coupling pin, and wherein each pair of cam slots is movably coupled about a cam pin that is engaged to the corresponding coupling pin that is positioned between the cam disc members.

6. The actuator decoupler of claim 5, wherein each cam slot defines a profile that extends angularly and laterally about the longitudinal axis such that a first slot portion of each cam slot is laterally proximate the longitudinal axis and a second slot portion angularly spaced from the first portion and laterally distal the longitudinal axis.

7. The actuator decoupler of claim 6, wherein each cam pin is positioned within the first slot portion of a corresponding pair of cam slots when the at least one engageable locking member retains the preloaded torque of the torsion spring and maintains the engagement of the at least one coupling pin with the sleeve member and the driven part, and wherein each cam pin is positioned within the second slot portion of a corresponding pair of cam slots to disengage the at least one coupling pin from at least the driven part.

8. The actuator decoupler of claim 7, wherein each cam slot is configured such that when the at least one engageable locking member releases the preload torque of the torsion spring the cam disc rotates in a first direction about the longitudinal axis and such that the position of each cam pin moves with a corresponding pair of cam slots from the first slot portion to the second slot portion.

9. The actuator decoupler of claim 8, wherein the lateral distance between the first slot portion and the second slot portion of each cam slot is greater than the lateral distance of each pin in the aperture of the driven part when each cam pin is selectively engaged with the driven part.

10. The actuator decoupler of claim 9, wherein each cam slot is configured such that the first slot portion extends for predetermined degree of angulation about the longitudinal axis, and wherein the lateral location of the first slot portion of the each cam slot is constant to allow the cam disc to gain kinetic energy as it rotates in the first direction.

11. The actuator decoupler of claim 1, wherein the at least one engageable locking member is configured to interact with a secondary actuator that is responsive to a jam in the actuation system, and wherein the at least one engageable locking member includes a first arm configured to selectively engage the cam disc in a locking position to selectively rotationally fix the cam disc to selectively retain the preloaded torque of the torsion spring and to maintain the engagement of the at least one coupling pin with the sleeve member and the driven part.

12. The actuator decoupler of claim 11, wherein the at least one engageable locking member includes second and third longitudinally spaced arms configured to receive a portion of the secondary actuator therebetween, and wherein translation of the portion of the secondary actuator in a first longitudinal direction results in the portion interacting with the second arm and thereby repositioning the at least one engageable locking member from the locking position to the unlocking position to selectively disengage the first arm from the cam disc to release the preloaded torque of the torsion spring to disengage the at least one coupling pin from at least the driven part.

13. The actuator decoupler of claim 12, wherein when the portion of the secondary actuator is positioned between the second and third arms of the at least one engageable locking member and the at least one engageable locking member is in the locking position, the third arm is positioned on an opposing longitudinal side of the portion of the secondary actuator as compared to the second arm to prevent the at least one engageable locking member from repositioning from the locking position to the unlocking position without translation of the at least one engageable locking member.

14. The actuator decoupler of claim 1, wherein the at least one preloaded energy mechanism includes at least one preloaded cantilever member extending from the housing member and defining a free end, wherein the at least one coupling pin is provided on a portion of the at least one cantilever member adjacent the free end, and wherein the at least one cantilever member is deformed to preload the at least one cantilever member and position the at least one coupling pin within an aperture of the second portion of the sleeve member and an aperture of the driven part when each coupling pin is selectively engaged with the sleeve member and the driven part.

15. The actuator decoupler of claim 1, wherein the second portion of the sleeve member is configured to couple to the driving part to receive at least a torque from the driving part, and thereby rotate about the longitudinal axis, wherein the sleeve member and the driven part are at least rotationally fixed to one another by the at least one coupling pin when the driven part is coupled to the sleeve member, and wherein the driven part is free to translate at least rotationally with respect to the sleeve member and the driving part when the at least one coupling pin is disengaged from the driven part of the sleeve member.

16. The actuator decoupler of claim 15, wherein the sleeve member and the driven part are longitudinally fixed to one another by the at least one coupling pin when the driven part is coupled to the sleeve member, and wherein the driven part is free to translate longitudinally with respect to the sleeve member and the driving part when the at least one coupling pin is disengaged from the driven part of the sleeve member.

17. The actuator decoupler of claim 1, wherein the second portion of the sleeve member is configured to couple to the driving part to receive at least a force along the longitudinal axis from the driving part, and thereby translate along the longitudinal axis, wherein the sleeve member and the driven part are at least longitudinally fixed to one another by the at least one coupling pin when the driven part is coupled to the sleeve member, and wherein the driven part is free to translate at least longitudinally with respect to the sleeve member and the driving part when the at least one coupling pin is disengaged from the driven part of the sleeve member.

18. An actuator decoupler for selectively coupling and decoupling a driven part including an aperture with a driving part of an actuation system such that when selectively coupled the driven part is at least rotationally fixed to the driving part and when selectively decoupled the driven part is at least one of rotationally and longitudinally free with respect to the driving part, the actuator decoupler including:

a sleeve member defining a longitudinal axis and an aperture and configured to receive at least a torque via the driving part and, upon receipt thereof, to rotate about the longitudinal axis;

a cam disc rotationally coupled about the sleeve member and including two longitudinally spaced cam members, the cam members including at least one pair of substantially aligned cam slots defining a cam profile;

at least one coupling pin carried within the aperture of the sleeve member, and a pair of cam slots of the cam disc and positioned at least partially between the cam members of the cam disc;

a housing member rotationally and longitudinally fixed to the sleeve member and including at least one movable locking member for selectively rotationally locking the cam disc to the housing member and, thereby, the sleeve member; and no more than one energy mechanism coupled to the housing member and the cam disc and configured to deform and thereby produce a preload torque to the cam disc in a first direction upon rotation of the cam disc about the sleeve member in a second direction that substantially opposes the first direction, wherein the cam profile is configured such that at a second angular position of the cam disc each cam slot, and thereby each coupling pin carried therein, is spaced laterally further from the longitudinal axis as compared to a first angular position, wherein when the aperture of the sleeve member is aligned with the aperture of the driven part, the cam disc can be rotated about the sleeve member in the second direction to the first angular position and selectively locked by the at least one movable locking member to preload the torsion spring and bias the cam disc in the first direction, and to position each coupling pin at least partially within the aperture of the driven part to selectively couple the driven part with the driving part via the actuator decoupler, and wherein the at least one movable locking member is configured to be translatable by a secondary actuator to disengage from the cam disc and release the preload torque of the energy mechanism and thereby rotate the cam disc in the first direction to the second angular position to laterally translate each coupling pin away from the longitudinal axis such that each coupling pin is removed from the aperture of the driven part to selectively decouple the driven part with the driving part via the actuator decoupler.

19. The actuator decoupler of claim 18, wherein the at least one coupling pin includes at least one cam pin member, and the at least one cam pin member is carried within a pair of cam slots.

20. The actuator decoupler of claim 18, wherein the cam members include an even number of pairs of substantially aligned cam slots symmetrically disposed about the longitudinal axis, wherein a coupling pin is carried within each pair of cam slots and the aperture of the sleeve member, and wherein the housing member includes at least two locking members symmetrically disposed about the longitudinal axis.

21. The actuator decoupler of claim 18, wherein the cam disc includes slots about the periphery of at least one cam member, wherein the at least one locking member includes a first arm including a protrusion configured to engage a slot of the cam disc, and wherein the at least one locking member further includes second and third arms longitudinally spaced from one another and configured to receive a secondary actuator therebetween.

22. The actuator decoupler of claim 18, wherein when the driving part and the driven part are selectively decoupled, the driven part is at least rotationally and longitudinally free to translate with respect to the driving part.

23. An actuator decoupler for selectively coupling to an actuation system such that at least a first component of the actuation system is at least rotationally fixed to the actuator decoupler when the actuation system is functioning properly, and for selectively decoupling from at least the first component when a jam occurs in the actuation system such that the first component is capable of rotationally and longitudinally translating with respect to the actuator decoupler, the actuator decoupler including:

a sleeve member configured to engage the first component of the actuation system such that at least one aperture of the sleeve member is aligned with at least one aperture of the first component;

a housing member rotationally and longitudinally fixed to the sleeve member;

at least one coupling pin configured to translate into, and out of, engagement within the at least one aperture of the sleeve member and the at least one aperture of the first component when the first component is engaged with the sleeve member to selectively couple the actuator decoupler to the first component to at least rotationally fix at least the first component of the actuation system to the actuator decoupler;

a biasing member configured to bias the at least one coupling pin out of engagement within the at least one aperture of the first component when the actuator decoupler is selectively coupled to the actuation system; and an engageable locking member rotatably coupled to the housing member and, selectively preventing the biasing member from translating the at least one coupling pin out of engagement within the at least one aperture of the first component when the actuator decoupler is coupled to the actuation system and the actuation system is properly functioning, and selectively releasing the biasing member to translate the at least one coupling pin out of engagement within the at least one aperture of the first component when the actuator decoupler is coupled to the actuation system and a jam occurs in the actuation system to decouple the first component from the actuator decoupler such that at least the first component is capable of rotationally and longitudinally translating with respect to the actuator decoupler.

24. The actuator decoupler of claim 23, wherein the locking member is configured to be responsive to longitudinal movement of a secondary actuator to translate between a first orientation in which the locking member prevents the biasing member from translating the at least one coupling pin and a second orientation in which the biasing member biases the at least one coupling pin and, in response thereto, translates the at least one coupling pin, and wherein the locking member is configured such that translation of the locking member between the first orientation and the second orientation is prevented in any manner other than longitudinal translation of the secondary actuator.

* * * * *